US009130633B2

(12) United States Patent
Oyama

(10) Patent No.: US 9,130,633 B2
(45) Date of Patent: Sep. 8, 2015

(54) WIRELESS COMMUNICATION DEVICE, WIRELESS COMMUNICATION SYSTEM, AND METHOD FOR DETECTING INTERFERENCE DIRECTION

(75) Inventor: Teppei Oyama, Yokosuka (JP)

(73) Assignee: FUJITSU LIMITED, Kawasaki (JP)

(*) Notice: Subject to any disclaimer, the term of this patent is extended or adjusted under 35 U.S.C. 154(b) by 594 days.

(21) Appl. No.: 13/430,758

(22) Filed: Mar. 27, 2012

(65) Prior Publication Data
US 2012/0299774 A1 Nov. 29, 2012

(30) Foreign Application Priority Data

May 27, 2011 (JP) ................. 2011-118681

(51) Int. Cl.
*H01Q 3/00* (2006.01)
*H04B 7/06* (2006.01)
*G01S 3/20* (2006.01)
*H04W 16/28* (2009.01)

(52) U.S. Cl.
CPC ............. *H04B 7/0695* (2013.01); *G01S 3/20* (2013.01); *H04W 16/28* (2013.01)

(58) Field of Classification Search
CPC .......... H01Q 3/00; H04B 7/00; H04B 7/0695; G01S 1/08; G01S 3/20; H04W 16/28
USPC ............ 342/372, 368, 367, 359, 386
See application file for complete search history.

(56) References Cited

U.S. PATENT DOCUMENTS

2002/0089451 A1* 7/2002 Wang et al. .............. 342/458
2005/0255891 A1  11/2005 Takai
2008/0026763 A1* 1/2008 van Rensburg et al. ...... 455/446

FOREIGN PATENT DOCUMENTS

JP  2003-174368    6/2003
JP  2003-332960   11/2003

OTHER PUBLICATIONS

Notification of Reasons for Refusal dated Jan. 6, 2015, from the corresponding JP 2011-118681.

* cited by examiner

*Primary Examiner* — Harry Liu
(74) *Attorney, Agent, or Firm* — Katten Muchin Rosenman LLP

(57) ABSTRACT

There is provided a wireless communication device includes a transmitter configured to transmit a known signal in each of a plurality of first directions different from each other, a receiver configured to receive a plurality of first reflected waves, each of the plurality of first reflected waves being generated by the known signal transmitted in each of the plurality of first directions and to detect each of a plurality of first reception intensities, each of the plurality of first reception intensities being associated with each of the plurality of first reflected waves; and a controller configured to determine a transmission direction of a radio signal addressed to a first wireless terminal, based on the plurality of first reception intensities and to control the transmitter to transmit the radio signal in the transmission direction.

14 Claims, 20 Drawing Sheets

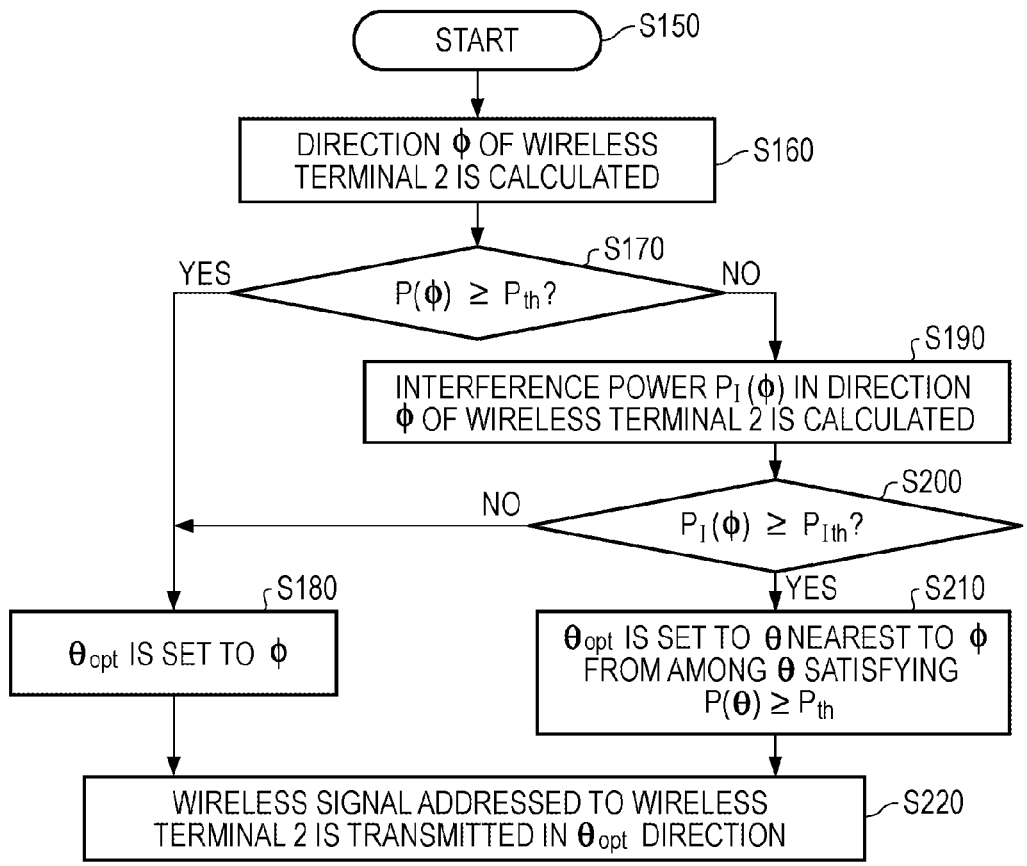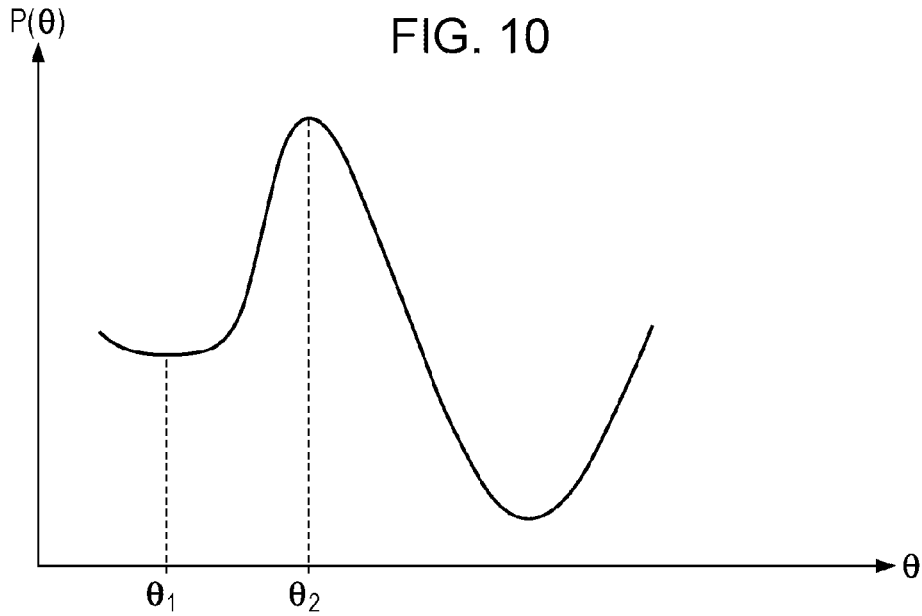

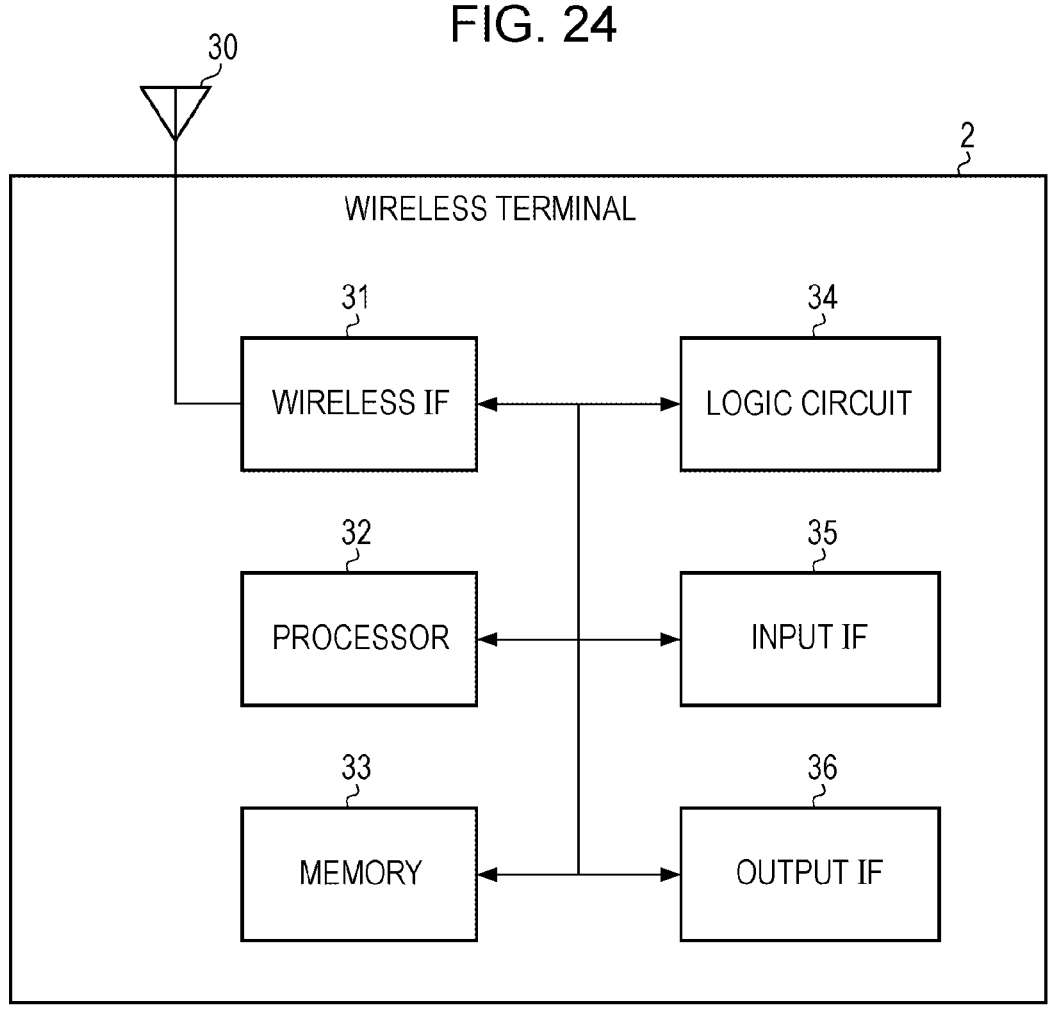

WIRELESS COMMUNICATION DEVICE, WIRELESS COMMUNICATION SYSTEM, AND METHOD FOR DETECTING INTERFERENCE DIRECTION

CROSS-REFERENCE TO RELATED APPLICATION

This application is based upon and claims the benefit of priority of the prior Japanese Patent Application No. 2011-118681, filed on May 27, 2011, the entire contents of which are incorporated herein by reference.

FIELD

The embodiments discussed herein are related to a wireless communication device, a wireless communication system, and a method for detecting an interference direction.

BACKGROUND

In a wireless communication system of recent years, in order to improve a throughput between transmission and reception, there have been used techniques such as beam forming based on a plurality of antennas, space division multiplexing based on Multiple Input Multiple Output (MIMO), and the like. For example, when the beam forming is used, a transmitter is capable of increasing or decreasing an antenna gain for a specific direction, by controlling the phase and the amplitude of each antenna element.

Accordingly, it may be possible for the transmitter to form a transmission beam headed in a direction, in which a communication partner is located, and transmit a wireless signal, or form a null point (null steering) so as to reduce interference with another communication device different from the communication partner. In addition, as a technique for reducing the interference with the other communication device, for example, a technique has been known in which the size of a room is measured and on the basis of the measurement result, data communication is performed with a transmission output sufficient to cover the whole inside of the room and insufficient to reach an adjoining room. Japanese Laid-open Patent Publication No. 2003-174368 discusses such a technique.

SUMMARY

According to an aspect of the invention, a wireless communication device includes a transmitter configured to transmit a known signal in each of a plurality of first directions different from each other, a receiver configured to receive a plurality of first reflected waves, each of the plurality of first reflected waves being generated by the known signal transmitted in each of the plurality of first directions and to detect each of a plurality of first reception intensities, each of the plurality of first reception intensities being associated with each of the plurality of first reflected waves, and a controller configured to determine a transmission direction of a radio signal addressed to a first wireless terminal, based on the plurality of first reception intensities and to control the transmitter to transmit the radio signal in the transmission direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a flowchart illustrating an example of an operation of a wireless base station according to an example of a second modification;

FIG. 10 is a diagram for explaining an operation of a wireless base station according to an example of a third modification;

FIG. 24 is a diagram illustrating an example of a hardware configuration of a wireless terminal.

DESCRIPTION OF EMBODIMENTS

Preliminary Consideration

Figure 1:
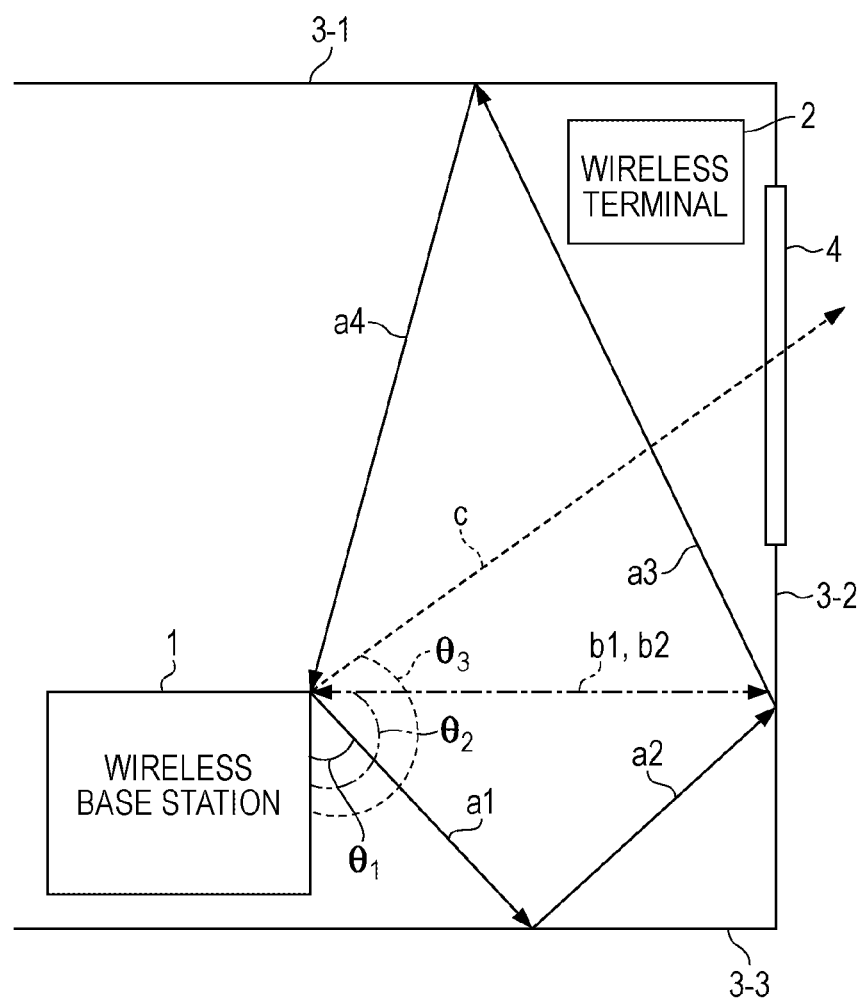
FIG. 1 is a diagram illustrating an example of a configuration of a wireless communication system according to one embodiment.

In a cellular mobile communication system or the like, when a wireless base station is installed, mainly a telecommunications carrier measures a radio wave environment or the like, or simulates the radio wave environment or the like using a radio wave propagation simulator. Thereby, a cell site location is set so that interference between wireless base stations is suppressed.

On the other hand, in order to achieve coverage enlargement into the inside of a building or the like, a wireless base station such as a femtocell base station or the like is installed, in some cases. In this case, mainly the owner of the building or the like installs the wireless base station. However, if the wireless base station is installed without regard for interference with another communication device, a wireless signal transmitted from the wireless base station interferes with the other communication device, in some cases. In addition, for example, in a situation in which authority to access the wireless base station is limited by the owner of the building, a wireless terminal or the like, located near the wireless base station, may not be connected to the wireless base station but may be connected to another wireless base station, in some cases. In such a case, owing to interference from the wireless base station where the access authority is limited, the performance of the wireless terminal is greatly reduced in some cases.

For example, as a method for reducing interference, there has been known a method (null steering) for forming the null point of a transmission beam at the position of the wireless terminal. However, in order to adequately form the null point at a position at which interference occurs, it is desirable to calculate the position at which interference occurs, on the basis of interference power or the like from another communication device, and it is desirable to perform processing for controlling the phase and amplitude of a transmission antenna, so as to form the null point at the calculated position.

Therefore, in a situation in which the wireless propagation environment varies from hour to hour, the processing for forming the null point becomes complicated, and a processing load increases in some cases. Therefore, it is preferable to easily detect a direction that may interfere. In addition, it is preferable to simply reduce the occurrence of interference.

Hereinafter, embodiments of the present technology will be described with reference to drawings. In this regard, however, the embodiments illustrated hereinafter are nothing more than exemplification, and it is not intended to exclude various modifications and the various applications of a technique, not clearly specified in each embodiment or an example of each modification illustrated hereinafter. Namely, it may be understood that each embodiment or an example of each modification is variously deformed without departing from the scope of the present technology.

[1] One Embodiment

(1.1) Example of Configuration of Wireless Communication System

FIG. 1 is a diagram illustrating an example of the configuration of a wireless communication system according to one embodiment. When being illustrated by example, this wireless communication system illustrated in FIG. 1 includes a wireless base station 1 and a wireless terminal 2. In addition, the number of the wireless base station 1 and the number of the wireless terminal 2 are not limited to numbers exemplified in FIG. 1.

When the wireless base station 1 is installed inside or outside of a building or the like, as exemplified in FIG. 1, walls 3-1, 3-2, and 3-3 formed of concrete and a window 4 formed of transparent glass are placed around the wireless base station 1, in some cases. Here, the walls 3-1, 3-2, and 3-3 are examples of a reflection object that may reflect a radio wave, and the window 4 is an example of transmission objects that may transmit the radio wave.

Here, the wireless base station 1 is an example of a wireless communication device capable of controlling the direction of a transmission beam, and for example, by forming the transmission beam headed in a predetermined direction, it may be possible for the wireless base station 1 to wirelessly communicate with the wireless terminal 2 located within a wireless area such as a cell, a sector, or the like, provided by the wireless base station 1. It may be possible for the wireless terminal 2 to receive a wireless signal, transmitted from the wireless base station 1 and addressed to the wireless terminal 2, and it may be possible for the wireless terminal 2 to subject the received wireless signal to predetermined reception processing. In addition, the predetermined reception processing includes wireless reception processing operations such as down-conversion, analog-to-digital conversion, and the like.

In the present example, the wireless base station 1 transmits a known signal such as a pilot signal or the like, in a plurality of directions. For example, when including an adaptive array antenna, the wireless base station 1 changes a direction in which the transmission beam is formed, by controlling the transmission antenna weight of each antenna element configuring the adaptive array antenna, and hence it may be possible for the wireless base station 1 to transmit the known signal in the plural directions. In addition, for example, when including a movable antenna, the wireless base station 1 changes a direction in which the transmission beam is formed, by controlling the direction of the movable antenna, and hence it may be possible to transmit the known signal in the plural directions.

At this time, as exemplified in FIG. 1, after the known signal transmitted from the wireless base station 1 in a $\theta_1$ direction has propagated through a path a1, a part thereof is reflected from the wall 3-3 in the direction of a path a2. In the same way, after the known signal reflected from the wall 3-3 has propagated through the path a2, a part thereof is reflected from the wall 3-2 in the direction of a path a3. In addition, after the known signal reflected from the wall 3-2 has propagated through the path a3, a part thereof is reflected from the wall 3-1, propagates through a path a4, and is received by the wireless base station 1.

After the known signal transmitted from the wireless base station 1 in a $\theta_2$ direction has propagated through a path b1, a part thereof is reflected from the wall 3-2, propagates through a path b2, and is received by the wireless base station 1. Furthermore, while the known signal transmitted from the wireless base station 1 in a $\theta_3$ direction propagates through a path c, and a part thereof is reflected from the window 4, most of the component thereof passes through the window 4. In addition, depending on a direction in which the known signal is transmitted, after having been reflected from one of the walls 3-1 to 3-3 at least once, the known signal propagates through the window 4, in some case.

In this way, depending on the transmission direction of the known signal, the result of the known signal is different. For example, this is because the radio wave reflectance of the transparent glass is as small as 0.03 while the radio wave reflectance of the concrete is 0.5. Here, since most of a wireless signal propagating in the direction toward the window 4 passes through the window 4, the wireless signal propagating in the corresponding direction interferences with another communication device different from the wireless terminal 2 that is the communication partner of the wireless base station 1, in some cases.

Therefore, in the present example, an interference direction is detected by utilizing the point that, at the wireless base station 1, the reception intensity of a reflected wave reflected with respect to a direction (hereinafter, also referred to as an interference direction) that may interference with another communication device is significantly small compared with the reception intensity of a reflected wave from another direction. Specifically, for example, the wireless base station 1 performs transmission beam scanning so that the known signal is transmitted in a plurality of directions, and the wireless base station 1 detects the interference direction on the basis of the reception intensity of the reflected wave of the known signal transmitted in each direction.

Accordingly, while not performing complicated processing of the related art, used for forming a null point, it may be possible for the wireless base station 1 to easily detect the interference direction. In addition, for example, since it may be possible for the wireless base station 1 to transmit a wireless signal, addressed to the wireless terminal 2 that is the communication partner of the self-station 1, in a direction different from the above-mentioned interference direction, it may be possible to easily reduce the occurrence of interference with another communication device.

(1.2) Example of Configuration of Wireless Base Station 1

Figure 2:
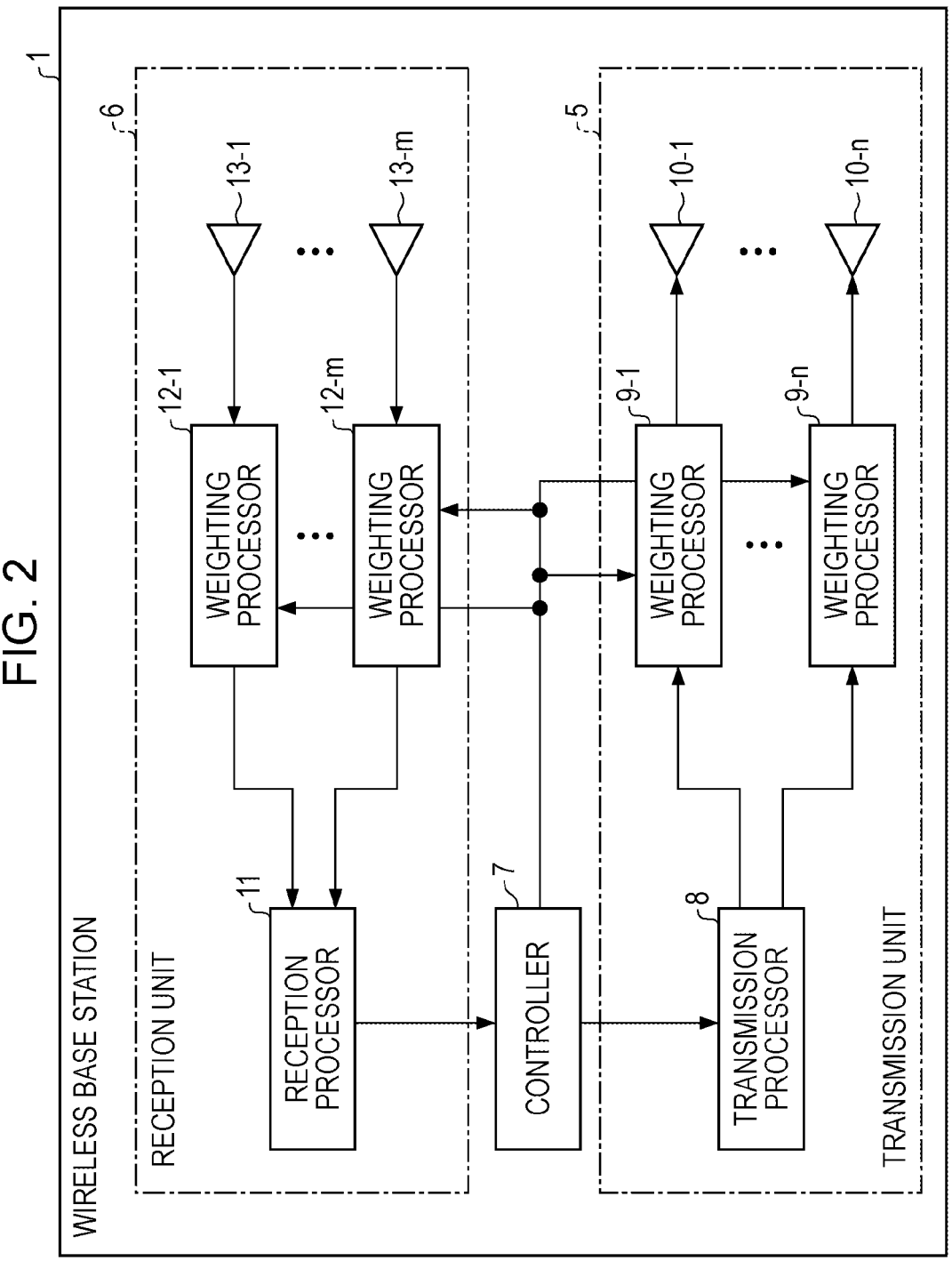
FIG. 2 is a diagram illustrating an example of a configuration of a wireless base station illustrated in FIG. 1.

FIG. 2 is a diagram illustrating an example of the configuration of the wireless base station 1. The wireless base station 1 illustrated in FIG. 2 includes a transmission unit 5, a reception unit 6, and a controller 7. The transmission unit 5 transmits a known signal such as a pilot signal or the like in a plurality of directions. In addition, it may be possible for the transmission unit 5 to transmit a wireless signal addressed to the wireless terminal 2.

Therefore, the transmission unit 5 includes a transmission processor 8, weighting processors 9-1, ..., and 9-n (n: an integer number greater than or equal to 2), and transmission antennas 10-1, ..., and 10-n. In addition, hereinafter, when not being discriminated, the weighting processors 9-1, ..., and 9-n are simply expressed as weighting processor 9, and when not being discriminated, the transmission antennas 10-1, ..., and 10-n are simply expressed as transmission antenna 10.

The transmission processor 8 generates and outputs a known signal such as a pilot signal or the like to the weighting processor 9. In addition, during communication with the wireless terminal 2 that is the communication partner, the transmission processor 8 may generate and output a downlink signal addressed to the wireless terminal 2, to the weighting processor 9. In addition, for example, a timing at which the transmission processor 8 generates the known signal may be a regular or irregular timing based on an instruction from the controller 7 or a timing triggered by an event such as the timing of the power activation of the wireless base station 1 or the like. In addition, the transmission processor 8 may wait until the reflected wave of a known signal is received by the reception unit 6 after the known signal has been transmitted in a direction, and may sequentially transmit a subsequent known signal in a different direction.

The weighting processor 9 performs weighting processing in which each transmission antenna weight is superimposed on a downlink signal to be transmitted from the transmission processor 8 through each transmission antenna 10. In addition, the transmission antenna weight is information relating to a phase or the like about each transmission antenna 10, and for example, a phase displacement amount or the like is controlled by the controller 7. The transmission antenna weight is controlled, and hence a direction is changed in which a transmission beam radiated from the transmission antenna 10 is formed. Therefore, it may be possible for the transmission unit 5 to transmit the known signal in a plurality of directions. In addition, during communication with the wireless terminal 2 that is a communication partner, the transmission antenna weight is controlled so that a downlink signal addressed to the wireless terminal 2 is transmitted in a predetermined transmission direction.

In addition, the transmission antenna 10 is configured as an adaptive array antenna, and sends out the known signal or the wireless signal addressed to the wireless terminal 2 in a direction based on the transmission antenna weight controlled by the controller 7. On the other hand, the reception unit 6 receives the reflected wave of the known signal transmitted by the transmission unit 5, and detects the reception intensity of the reflected wave. In addition, the reception unit 6 receives an uplink signal from the wireless terminal 2, and it may be possible for the reception unit 6 to detect a direction in which the wireless terminal 2 is located, on the basis of the uplink signal.

Therefore, the reception unit 6 includes a reception processor 11 and weighting processors 12-1, ..., and 12-m (m: an integer number greater than or equal to 2), and reception antennas 13-1, ..., and 13-m. In addition, hereinafter, when not being discriminated, the weighting processors 12-1, ..., and 12-m are simply expressed as weighting processor 12, and when not being discriminated, the reception antennas 13-1, ..., and 13-m are simply expressed as reception antenna 13.

The reception antenna 13 receives the reflected wave of the known signal transmitted by the transmission unit 5 and the uplink signal transmitted from the wireless terminal 2. In addition, the weighting processor 12 performs weighting processing in which each reception antenna weight is superimposed on a signal received by each reception antenna 13. In addition, the reception antenna weight is information relating to a phase or the like about each reception antenna, and for example, a phase displacement amount or the like is controlled by the controller 7.

By scanning the reception antenna weight, it may be possible for the wireless base station 1 to detect a reception antenna weight where the antenna gain of the uplink signal from the wireless terminal 2 is maximized, and it may be possible for the wireless base station 1 to calculate the direction of the wireless terminal 2 on the basis of the detection result. The reception processor 11 detects a reception intensity such as reception power or the like relating to the reflected wave of the known signal, received by the reception antenna 13. In addition, the reception processor 11 performs wireless reception processing operations, such as down-conversion, analog-to-digital conversion, demodulation, decoding processing, and the like, on the uplink signal from the wireless terminal 2, received by the reception antenna 13.

Furthermore, the reception processor 11 may detect the reception power (interference power) of an interference signal from another communication device, which may be received by the reception antenna 13. Here, in addition to controlling the transmission antenna weight and the reception antenna weight as described above, the controller 7 detects a direction (interference direction) that may interference with another communication device, on the basis of the reception intensity of the reflected wave detected by the reception unit 6.

In addition, on the basis of the reception intensity of the reflected wave, detected by the reception unit 6, the controller 7 determines the transmission direction of the wireless signal addressed to the wireless terminal 2 that is a communication partner, and controls the transmission unit 5 so that the wireless signal is transmitted in the corresponding transmission direction. Here, a detection operation for an interference direction, performed by the controller 7, will be described using FIG. 3. For ease of explanation, a case will be described in which the wireless base station 1 detects the interference direction from one of horizontal directions, the interference direction may be detected from one of three-dimensional directions including horizontal directions and vertical directions, as described later.

Figure 3:
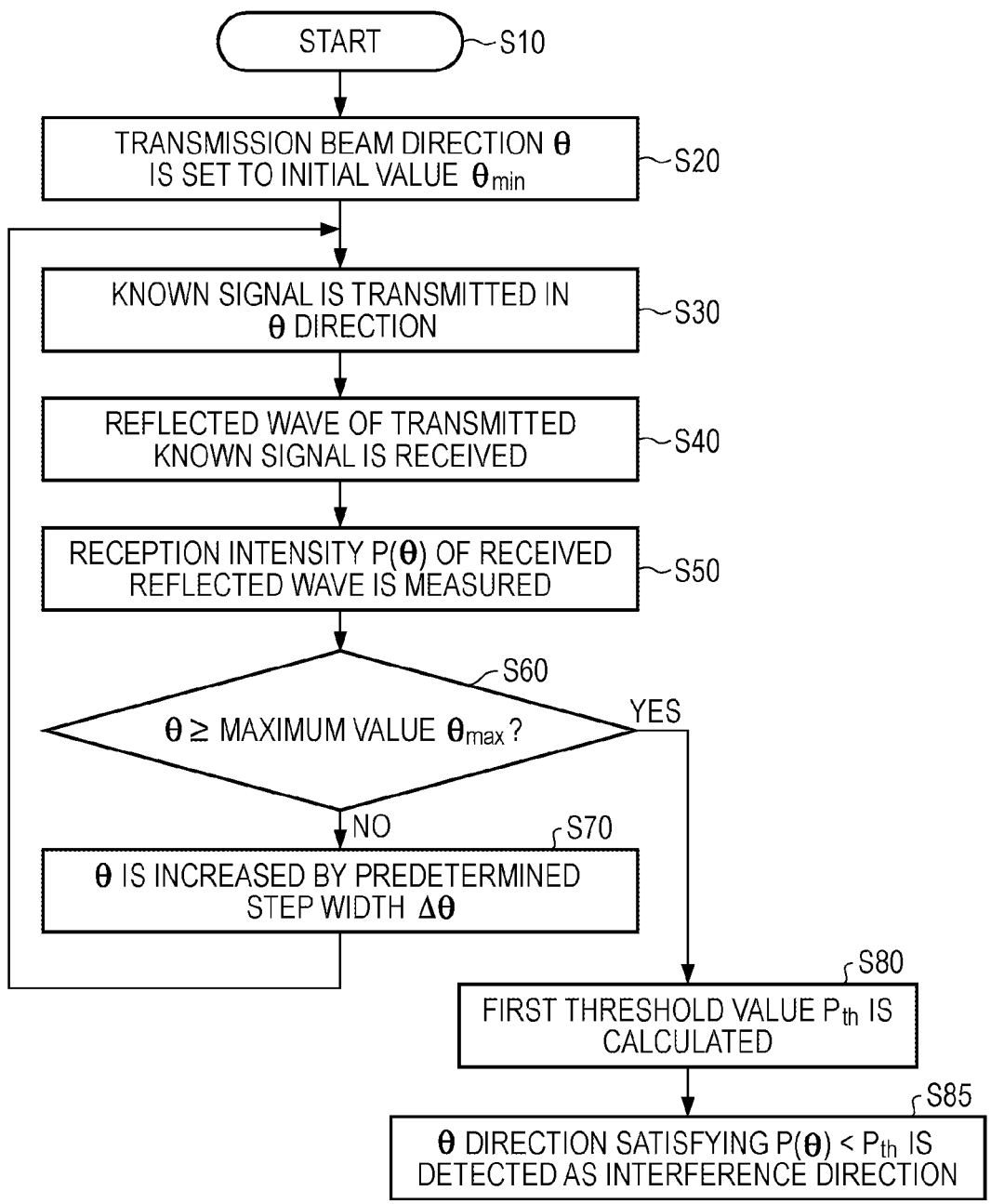
FIG. 3 is a flowchart illustrating an example of an operation of the wireless base station illustrated in FIG. 1.

As illustrated in FIG. 3, when the detection processing for the interference direction has been started (Step S10), the controller 7 performs beam scanning using the known signal with changing the direction thereof from a $\theta_{min}$ (0 degrees≤$\theta_{min}$<360 degrees) direction to a $\theta_{max}$ (0 degrees<$\theta_{max}$≤360 degrees) direction. While it is desirable that the detection processing for the interference direction is started before the wireless signal addressed to the wireless terminal 2 is transmitted, the detection processing for the interference direction may also be started at a regular or irregular timing based on an instruction from the controller 7 or a timing triggered by an event such as the timing of the power activation of the wireless base station 1 or the like. It is also desirable that the detection processing for the interference direction is started, for example, in a time period in which the wireless base station 1 and the wireless terminal 2 do not communicate with each other, or in a time period in which there is no access from the wireless terminal 2. This is because the reduction of the performance of usual transmission/reception processing is avoided.

First, the controller 7 controls the transmission unit 5 so that a transmission beam direction θ becomes the initial setting value $\theta_{min}$ of a beam scanning direction (Step S20). As described above, the transmission antenna weight to be supplied to the weighting processor 9 is controlled by the controller 7, and hence it may be possible to set the transmission direction of the known signal to the $\theta_{min}$ direction. When the wireless base station 1 includes a movable antenna in place of the transmission antenna 10 as the adaptive array antenna, the transmission direction of the known signal may also be controlled by controlling the direction of the movable antenna as described above.

In addition, the transmission unit 5 transmits the known signal in the transmission beam direction θ set in Step S20 (Step S30). The known signal transmitted from the transmission unit 5 is reflected from one of the walls 3-1 to 3-3, the window 4, or the like at least once, and received by the reception unit 6 (Step S40). The reception unit 6 measures a reception intensity P(θ) such as the reception power or the like of the received reflected wave (Step S50).

Accordingly, it may be possible for the controller 7 to acquire the reception intensity P($\theta_{min}$) of the reflected wave of the known signal transmitted in the $\theta_{min}$ direction, and it may be possible for the wireless base station 1 to recognize the degree of an intensity the reflected wave of the known signal transmitted in the $\theta_{min}$ direction has when the reflected wave returns to the wireless base station 1. When the measurement of the reception intensity P(θ) with respect to the $\theta_{min}$ direction has finished, the controller 7 determines whether the current transmission beam direction θ is greater than or equal to the maximum setting value $\theta_{max}$ of the beam scanning direction (Step S60).

When it has been determined that the current transmission beam direction θ is less than the maximum setting value $\theta_{max}$ of the beam scanning direction (Step S60: "NO" route), the controller 7 adds a predetermined step width Δθ (>0 degrees) to the transmission beam direction (Step S70), and repeats processing operations in the above-mentioned Steps S30 to S60. On the other hand, when it has been determined that the current transmission beam direction θ is greater than or equal to the maximum setting value $\theta_{max}$ (Step S60: "YES" route), the controller 7 calculates a first threshold value $P_{th}$ on the basis of individual reception intensities P($\theta_{min}$) to P($\theta_{max}$) detected in the reception unit 6 (Step S80).

This first threshold value $P_{th}$ is used for detecting a direction (interference direction) in which the wireless signal transmitted from the wireless base station 1 may interfere with another communication device. Since it is desirable that at least a relatively low reception intensity is detected from among the reception intensities of the individual reflected waves measured by the beam scanning utilizing the known signal, the first threshold value $P_{th}$ may be determined on the basis of the average value of the reception intensities P(θ) of the reflected waves, for example. In this case, the first threshold value $P_{th}$ may be defined in accordance with the following Expression (1), for example.

[Expression 1]

$$P_{th} = \frac{1}{\theta_{max} - \theta_{min}} \int_{\theta_{min}}^{\theta_{max}} P(\theta) d\theta - P_0 \qquad (1)$$

$P_0$ ($P_0 \geq 0$) is a constant value. This $P_0$ may be regarded as a difference between the reception intensity of the reflected wave of the known signal transmitted in the interference direction and the reception intensity of the reflected wave of the known signal transmitted in another direction. For example, when the material of the walls 3-1 to 3-3 is concrete (radio wave reflectance=0.5), and the material of the window 4 is transparent glass (radio wave reflectance=0.03), the $P_0$ is set to about 10 dB.

Figure 4:
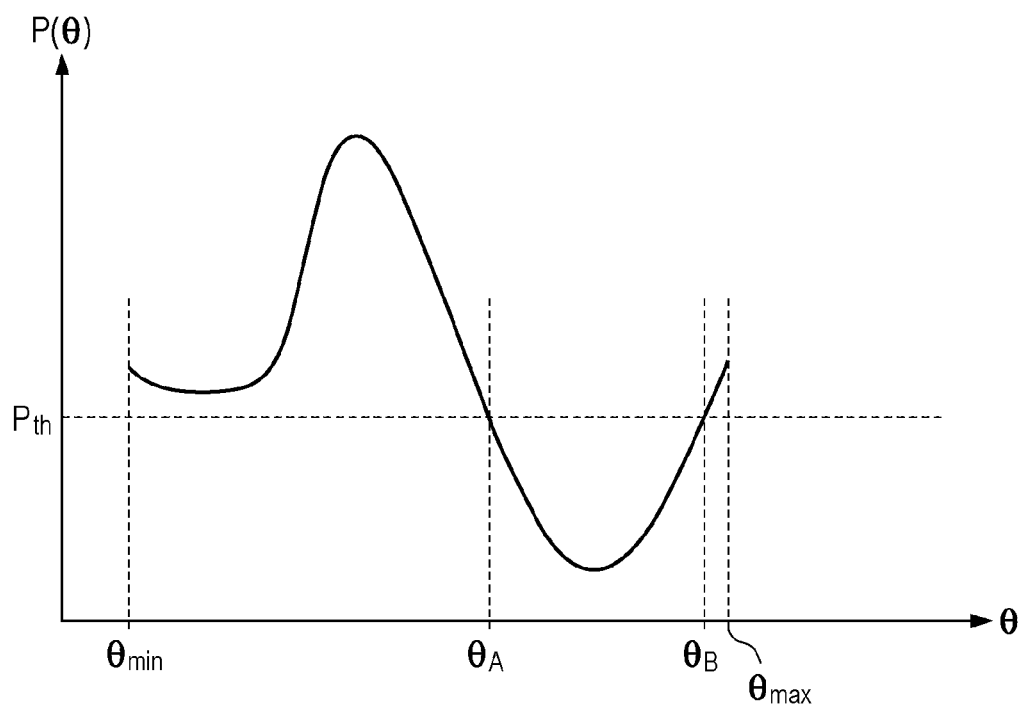
FIG. 4 is a diagram illustrating an example of a relationship between a transmission direction θ of a known signal and a reception intensity P(θ) of a reflected wave.

In addition, the wireless base station 1 detects, as the interference direction, a θ direction satisfying P(θ)<$P_{th}$ (Step S85). FIG. 4 is a diagram illustrating an example of a relationship between the transmission beam direction θ of a known signal and the reception intensity P(θ) of a reflected wave corresponding to the known signal. As illustrated in FIG. 4, the directions of $\theta_A$ ($\theta_{min} \leq \theta_A \leq \theta_{max}$) to $\theta_B$ ($\theta_A \leq \theta_B \leq \theta_{max}$) in which the reception intensity P(θ) of the reflected wave is less than the first threshold value $P_{th}$ indicate that most of the transmitted known signal has not been reflected. Therefore, the wireless base station 1 detects the corresponding directions as the interference directions.

In addition, it may also be considered that the reception intensity is decreased with an increase in the number of times of reflection of the known signal at the walls 3-1 to 3-3. However, for example, since the reflectance of concrete is 0.5, the reflectance of transparent glass is 0.03, there is a difference, between both thereof, more than 10 times larger than the reflectance of transparent glass. Accordingly, in order to obtain a reception intensity as large as a reception intensity obtained when the transmitted known signal has been reflected from the window 4 once, it is desirable that the transmitted known signal is repeatedly reflected from the walls 3-1 to 3-3 approximately more than four times. Therefore, by adequately setting the first threshold value $P_{th}$, even if the transmitted known signal is reflected from the walls 3-1 to 3-3 more than once, it may be possible to improve the detection accuracy of the interference direction.

In addition, it has been known that the radio wave reflectance of a metallic plate is 1.0, the radio wave reflectance of reinforced concrete is 0.7, the radio wave reflectance of unreinforced concrete is 0.5, the radio wave reflectance of transparent glass is 0.03, and the radio wave reflectance of a porcelain tile is 0.03. Therefore, by setting the value of the $P_0$ on the basis of the material of the walls 3-1 to 3-3 and the material of the window 4, it may be possible to further enhance the detection accuracy of the interference direction.

Next, processing for setting the transmission direction $\theta_{opt}$ ($\theta_{min} \le \theta_{opt} \le \theta_{max}$) of the wireless signal addressed to the wireless terminal 2 will be described using FIG. 5. For ease of explanation, a case will be described in which the wireless base station 1 sets the transmission direction $\theta_{opt}$ to one of horizontal directions, the transmission direction $\theta_{opt}$ of the wireless signal may be set to one of three-dimensional directions including horizontal directions and vertical directions, as described later.

Figure 5:
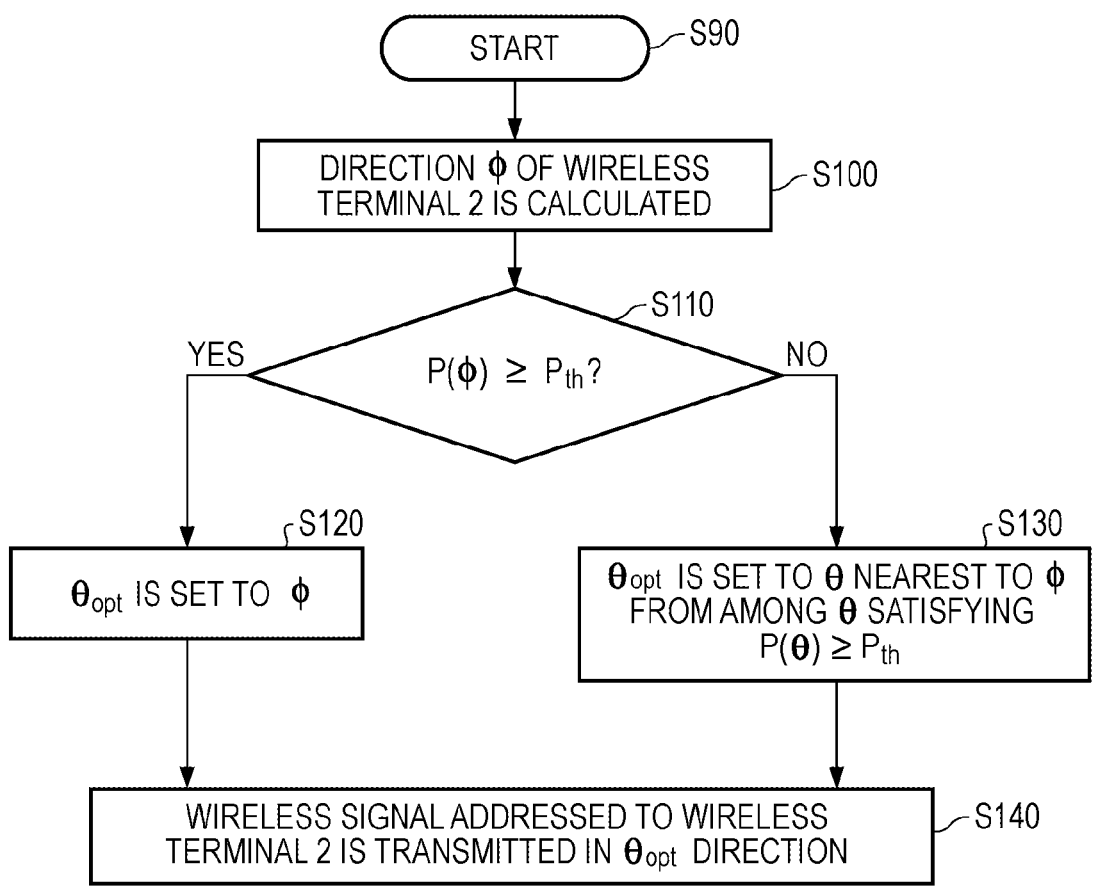
FIG. 5 is a flowchart illustrating an example of the operation of the wireless base station illustrated in FIG. 1.

As illustrated in FIG. 5, when transmission processing for the wireless signal has been started after the detection processing for the interference direction (Step S90), the controller 7 calculates a direction $\phi$ ($\phi \ge 0$ degrees) in which the wireless terminal 2 that is a communication partner is located (Step S100). For example, the direction $\phi$ of the wireless terminal 2 is calculated on the basis of the uplink signal from the wireless terminal 2, as described above. When the direction $\phi$ of the wireless terminal 2 is detected on the basis of the uplink signal, the controller 7 performs beam scanning with respect to a reception beam direction (sector direction) $\xi$ in the horizontal direction by controlling the reception antenna weight, as exemplified in FIG. 6. In addition, the controller 7 detects the reception beam direction $\xi$ (=$\phi$) where the reception antenna gain of the uplink signal is maximized, and detects the corresponding direction as the direction $\phi$ of the wireless terminal 2.

Next, the controller 7 determines whether the reception intensity $P(\phi)$ of the reflected wave of the known signal transmitted in the direction $\phi$ toward the wireless terminal 2 is greater than or equal to the first threshold value $P_{th}$ (Step S110). Here, when it is determined that the $P(\phi)$ is greater than or equal to the first threshold value $P_{th}$ (Step S110: "YES" route), the controller 7 sets, to $\phi$, the transmission direction $\theta_{opt}$ of the wireless signal addressed to the wireless terminal 2 (Step S120).

Figure 7:
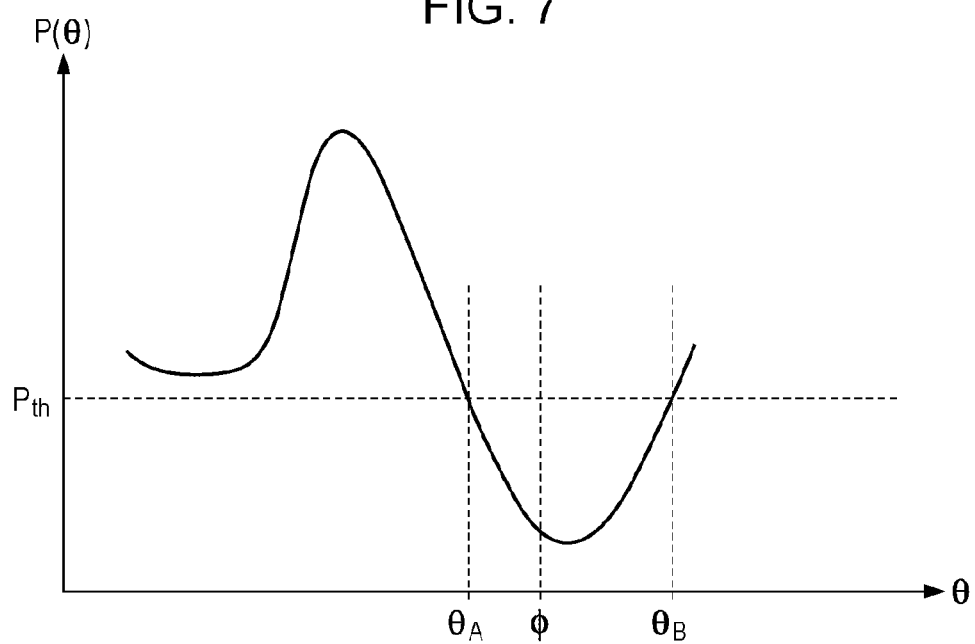
FIG. 7 is a diagram illustrating an example of setting of a transmission direction $\theta_{opt}$ of a wireless signal.

In addition, the transmission unit 5 transmits the wireless signal in the $\theta_{opt}$ (=$\phi$) direction (Step S140). On the other hand, when it is determined that the $P(\phi)$ is less than the first threshold value $P_{th}$ (Step S110: "NO" route), since the wireless signal is likely to interfere with another communication device, the wireless base station 1 does not transmit the wireless signal in the $\phi$ direction. Alternatively, as exemplified in FIG. 7, the controller 7 sets the transmission direction $\theta_{opt}$ of the wireless signal addressed to the wireless terminal 2 to a direction $\theta_A$ nearest to the $\phi$ direction, from among $\theta$ satisfying $P(\theta) \ge P_{th}$ (Step S130).

In addition, the transmission unit 5 transmits the wireless signal in the $\theta_{opt}$ (=$\theta_A$) direction that satisfies $P(\theta) \ge P_{th}$ and is nearest to the $\phi$ direction (Step S140). As described above, according to the present example, since the wireless base station 1 detects the interference direction on the basis of the reception intensity of each reflected wave of the known signal transmitted in the plural directions, it may be possible to significantly simplify the processing compared with the null point detection processing of the related art. As a result, it may be possible to significantly reduce a processing load in the wireless base station 1.

In addition, the wireless signal addressed to the wireless terminal 2 is not transmitted in the detected interference direction, and hence it may be possible to significantly reduce interference with another communication device.

[2] Example of First Modification

While, in the above-example, the direction $\phi$ in which the wireless terminal 2 is located is calculated on the basis of the uplink signal from the wireless terminal 2, the direction $\phi$ may also be detected on the basis of terminal location information included in user information transmitted from the wireless terminal 2 to the wireless base station 1, for example.

Figure 8:
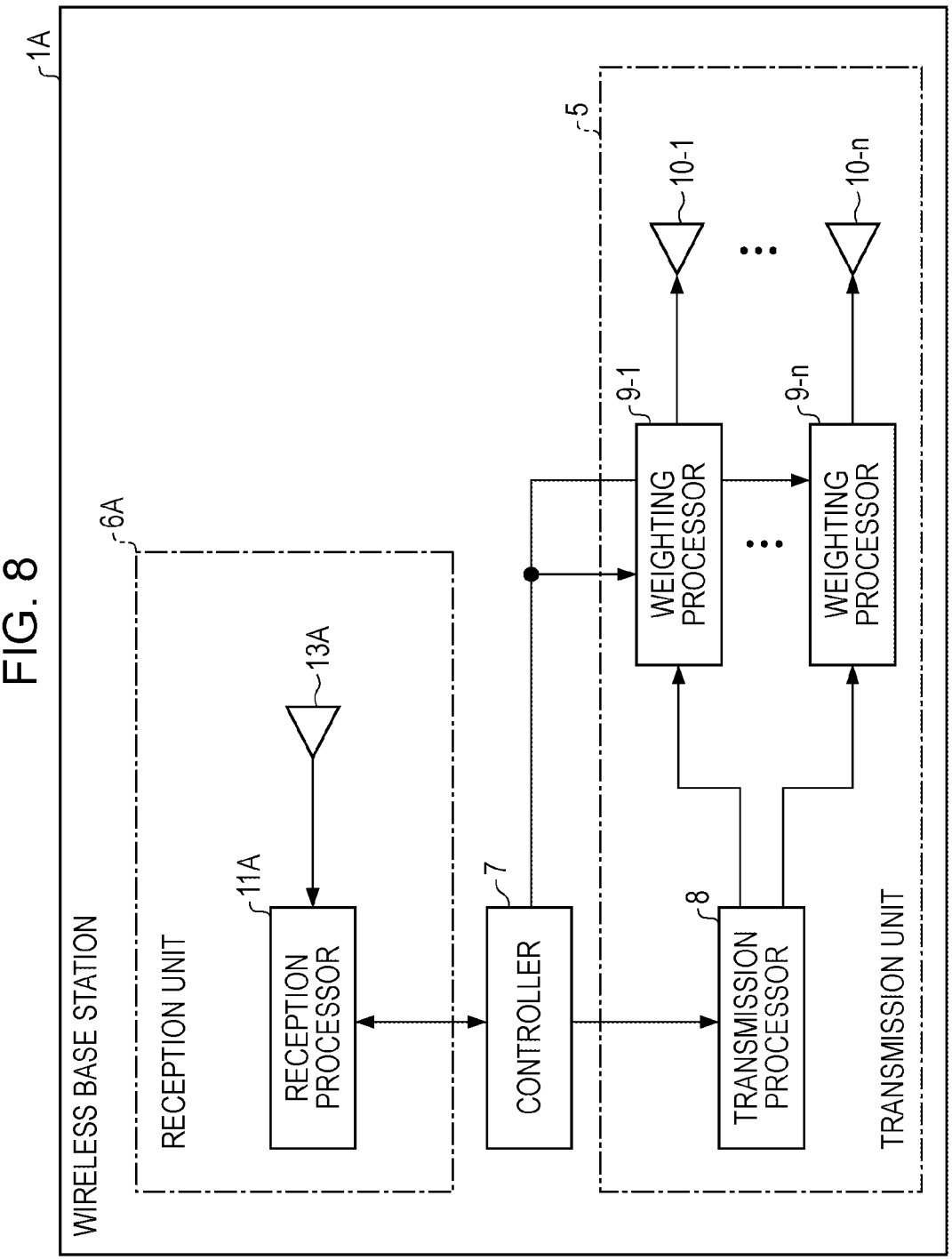
FIG. 8 is a diagram illustrating an example of a configuration of a wireless base station according to an example of a first modification.

The terminal location information is location information including information relating to a latitude, a longitude, and an altitude, which indicate the location of the wireless terminal 2 and for example, the terminal location information is acquired using the Global Positioning System (GPS) function of the wireless terminal 2. In the present example, a wireless base station 1A exemplified in FIG. 8 may be used. The wireless base station 1A exemplified in FIG. 8 includes a reception unit 6A including a single reception antenna configuration, in place of the reception unit 6 in the wireless base station 1.

In the reception unit 6A, a reception antenna 13A receives the user information from the wireless terminal 2. Then a reception processor 11A extracts the terminal location information included in the user information, and calculates the direction in which the wireless terminal 2 is located, on the basis of the location of the wireless base station 1 and the extracted terminal location information. In addition, as for a portion to which the same symbol as in FIG. 2 is assigned in FIG. 8, since the portion has the same function as a portion illustrated in FIG. 2, the description thereof will be omitted.

According to the present example, since, in addition to obtaining the same advantageous effect as the above-mentioned one embodiment, it may be possible to omit the reception beam scanning based on the control of the reception antenna weight, it may be possible to further reduce the processing load.

[3] Example of Second Modification

When, in each of the above-mentioned examples, the direction $\phi$ in which the wireless terminal 2 is located is included in the detected interference direction, since the wireless signal addressed to the wireless terminal 2 is not transmitted in the direction $\phi$, it may be considered that transmission power in the wireless base station 1 increases.

Therefore, in the present example, when being less likely to interfere with another communication device, even if the direction $\phi$ in which the wireless terminal 2 is located is included in the interference direction, the wireless signal addressed to the wireless terminal 2 is transmitted in the direction $\phi$, and hence the increase of the transmission power is suppressed. The operation of the present example will be described using FIG. 9. As exemplified in FIG. 9, when transmission processing for the wireless signal has been started (Step S150), the controller 7 calculates the direction φ (φ≥0 degrees) in which the wireless terminal 2 is located (Step S160).

Next, the controller 7 determines whether the reception intensity P(φ) of a reflected wave with respect to the direction φ in which the wireless terminal 2 is located is greater than or equal to the first threshold value $P_{th}$ (Step S170). Here, when it is determined that the reception intensity P(φ) is greater than or equal to the first threshold value $P_{th}$ (Step S170: "YES" route), the controller 7 sets the transmission direction $\theta_{opt}$ of the wireless signal addressed to the wireless terminal 2 to φ (Step S180), and transmits the wireless signal to the wireless terminal 2 by controlling the transmission unit 5 so that the wireless signal is transmitted in the $\theta_{opt}$ (=φ) direction (Step S220).

On the other hand, when it is determined that the reception intensity P(φ) is less than the first threshold value $P_{th}$ (Step S170: "NO" route), the controller 7 detects the reception power $P_I(\phi)$ of an interference signal from another communication device, received from the direction φ in which the wireless terminal 2 is located (Step S190).

In addition, the controller 7 determines whether the detected reception power $P_I(\phi)$ of an interference signal is greater than or equal to a second threshold value $P_{Ith}$ (Step S200). The second threshold value $P_{Ith}$ is set to a value significantly smaller than the average value of interference power in the interference direction so as to significantly reduce the possibility of interfering with another communication device. For example, it may be considered that the second threshold value $P_{Ith}$ is determined by reference to a device noise in the wireless base station 1. Specifically, for example, it may be possible to set, as the second threshold value $P_{Ith}$, a value significant for an $N_{total}$ that is the sum of a preliminarily measured thermal noise and the above-mentioned device noise (noise figure). Examples of the significant value include a value about twice as large as the $N_{total}$ or a value more than 3 dB greater than the $N_{total}$ in dB notation.

Here, when it is determined that the detected reception power $P_I(\phi)$ of an interference signal is greater than or equal to the second threshold value $P_{Ith}$ (Step S200: "YES" route), the controller 7 determines that the possibility of interfering with another communication device is high, and as exemplified in FIG. 7, sets the transmission direction $\theta_{opt}$ of the wireless signal addressed to the wireless terminal 2 to a direction $\theta_A$ nearest to the φ direction, from among θ satisfying P(θ)≥$P_{th}$ (Step S210).

In addition, the controller 7 controls the transmission unit 5 so that the wireless signal is transmitted in the $\theta_{opt}$ (=$\theta_A$) direction that satisfies P(θ)≥$P_{th}$ and is nearest to the φ direction, and transmits the wireless signal to the wireless terminal 2 (Step S220). On the other hand, when it is determined that the detected reception power $P_I(\phi)$ of an interference signal is less than the second threshold value $P_{Ith}$ (Step S200: "NO" route), the controller 7 determines that the possibility of interfering with another communication device is low. Thereby, the controller 7 sets the transmission direction $\theta_{opt}$ of the wireless signal addressed to the wireless terminal 2 to φ (Step S180).

In addition, the controller 7 controls the transmission unit 5 so that the wireless signal is transmitted in the $\theta_{opt}$ (=φ) direction, and transmits the wireless signal to the wireless terminal 2 (Step S220).

As described above, according to the present example, even if the direction φ in which the wireless terminal 2 is located is included in the interference direction, it may be possible to cause a transmission beam to be headed in the direction φ in which the wireless terminal 2 is located, when the possibility of interfering with another communication device is low. Accordingly, it may be possible to suppress the increase of the transmission power in the wireless base station 1, and it may be possible to effectively utilize a wireless resource.

In addition, while, in the present example, by detecting the reception power of the interference signal of the other communication device from the direction φ in which the wireless terminal 2 is located, it is determined whether interference with the other communication device may occur, another wireless base station or the like, adjacent to the wireless base station 1, may notify the wireless base station 1 of a timing at which or a time period during which the other communication device performs the transmission and reception of a signal, for example. In this case, even if the direction φ in which the wireless terminal 2 is located is included in the interference direction at the timing or during the time period, given notice of by the other adjacent wireless base station, it may be possible for the wireless base station 1 to determine that the possibility of interfering with another communication device is low, and it may be possible for the wireless base station 1 to cause the transmission beam to be headed in the direction φ in which the wireless terminal 2 is located.

[4] Example of Third Modification

In addition, the reception intensity P(θ) of the reflected wave decreases with an increase in the length of the radio wave propagation path thereof, namely, the propagation delay thereof. For example, since the radio wave propagation paths a1 to a4 of the known signal transmitted in the $\theta_1$ direction illustrated in FIG. 1 are longer than the radio wave propagation paths b1 and b2 of the known signal transmitted in the $\theta_2$ direction illustrated in FIG. 1, the attenuation thereof is large, and the P($\theta_1$) becomes smaller than the P($\theta_2$) as exemplified in FIG. 10.

At this time, when the first threshold value $P_{th}$ is determined on the basis of the average value of the reception intensities of the reflected waves, the first threshold value $P_{th}$ may be set between the P($\theta_1$) and the P($\theta_2$), in some cases, and the $\theta_1$ direction is erroneously detected as the interference direction, in some cases. Therefore, in the present example, the first threshold value $P_{th}$ is varied on the basis of the propagation delay time of the known signal in each transmission direction so as to desirably detect the interference direction. In this case, the first threshold value $P_{th}$ is deformed as a $P_{th}(t_{delay})$ illustrated in the following Expression (2).

[Expression 2]

$$P_{th}(t_{delay}) = \frac{1}{\theta_{max} - \theta_{min}} \int_{\theta_{min}}^{\theta_{max}} P(\theta)d\theta - A\log t_{delay} - P_0 \quad (2)$$

Here, A is a constant value, and the $t_{delay}$ is a propagation delay time. The propagation delay time $t_{delay}$ may be defined by detecting a time from a timing at which the known signal has been transmitted to a timing at which the reflected wave of the corresponding known signal has been received. In addition, since, in view of free space propagation, it may be considered that the reception intensity of the reflected wave is reduced in accordance with the square of the radio wave propagation distance, namely, the square of the propagation delay time, it may be possible to use "2" as the value of the coefficient A, for example.

As described above, according to the present example, since, in addition to obtaining the same advantageous effect as the above-mentioned one embodiment, it may be possible to change a threshold value used for interference direction detection, in response to the radio wave propagation path length of the known signal, it may be possible to more desirably detect the interference direction.

[5] Example of Fourth Modification

Figure 11:
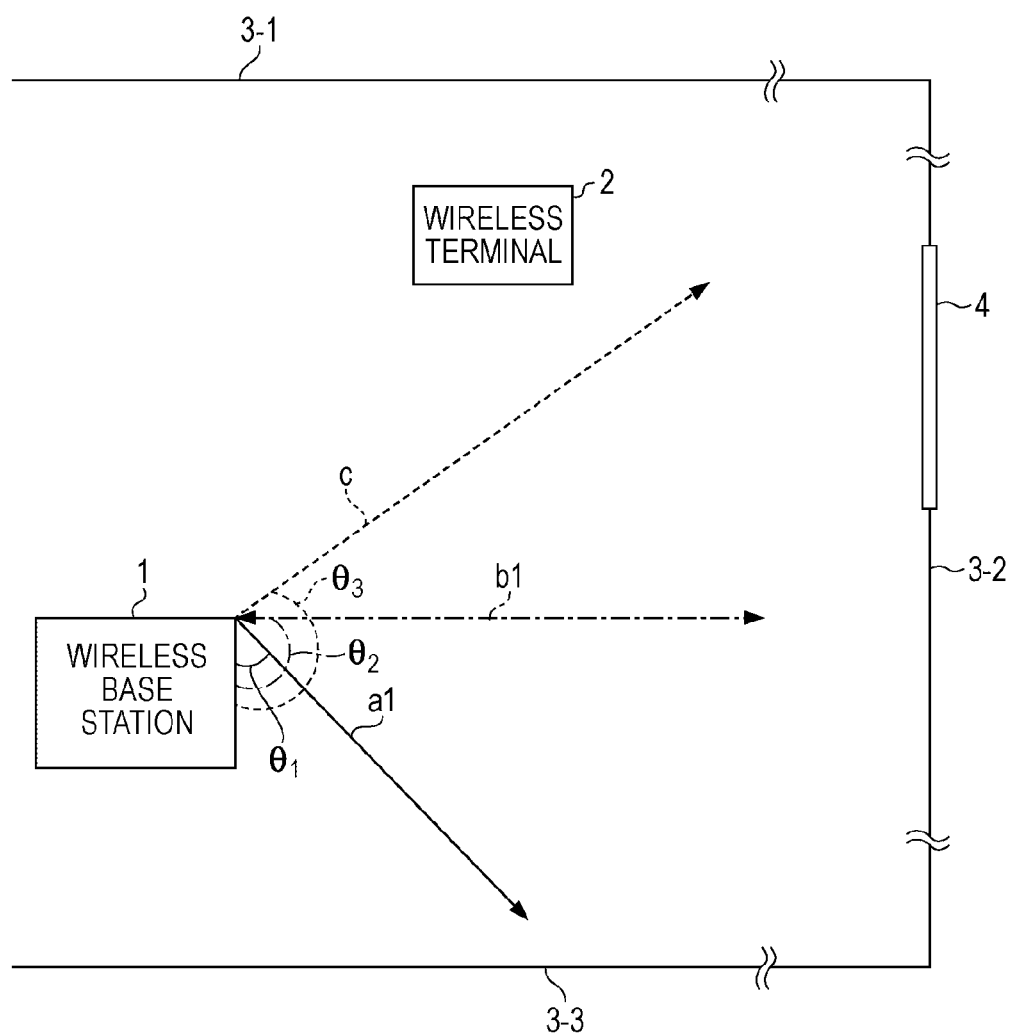
FIG. 11 is a diagram for explaining an operation of a wireless base station according to an example of a fourth modification.

In addition, as exemplified in FIG. 11, when distances between the wireless base station 1 and the walls 3-1 to 3-3 or a distance between the wireless base station 1 and the window 4 is large, the reflected wave of the known signal has not returned to the wireless base station 1, in some cases. In such a case, if the wireless base station 1 is installed inside of a building or the like, it may be possible to determine the transmission direction of the wireless signal without considering interference with the outside thereof.

Here, the average value of the reception intensities of the reflected waves may be regarded as reception power per angular direction of a reflected wave that returns owing to the reflection of the known signal transmitted in each direction. Therefore, by comparing the average value of the reception intensities of the reflected waves with the transmission power of the known signal, it may be possible to estimate the percentage of the reflected wave that returns to the wireless base station 1, from among the known signals transmitted in individual directions. Therefore, in the present example, when a determination expression illustrated in the following Expression (3) is satisfied, the controller 7 controls the transmission unit 5, regardless of the value of P($\phi$), so that the wireless signal is transmitted in the direction $\phi$ in which the wireless terminal 2 is located.

[Expression 3]

$$P - P_{ave} < P_{th}' \quad (3)$$

Here, the P indicates the transmission power of the known signal, the $P_{ave}$ indicates the average value of the reception intensities of the reflected waves, and the $P_{th}'$ indicates a third threshold value. For example, the third threshold value $P_{th}'$ may be set to 10 dB corresponding to a difference between the radio wave reflectance of concrete and the radio wave reflectance of transparent glass.

On the other hand, when the determination expression in the above-mentioned Expression (3) is not satisfied, the wireless base station 1 may also perform the operation illustrated in FIG. 5 or FIG. 9.

As described above, according to the present example, even if the direction $\phi$ in which the wireless terminal 2 is located is included in the interference direction, it may be possible to cause a transmission beam to be headed in the direction $\phi$ in which the wireless terminal 2 is located, when the possibility of interfering with another communication device is low. Accordingly, it may be possible to suppress the increase of the transmission power in the wireless base station 1, and it may be possible to effectively utilize a wireless resource.

In addition, when the average value $P_{ave}$ of the reception intensities of the individual reflected waves is less than the third threshold value $P_{th}'$, the controller 7 may also control the transmission unit 5, regardless of the value of P($\phi$), so that the wireless signal is transmitted in the direction $\phi$ in which the wireless terminal 2 is located.

[6] Example of Fifth Modification

In addition, if the wireless base station 1 receives the direct wave of the known signal after having transmitted the corresponding known signal, the wireless base station 1 may not desirably detect the interference direction, in some case. Therefore, in the present example, a transmission and reception operation is switched in a time division manner so that it may be possible for the wireless base station 1 to desirably receive the reflected wave without receiving the direct wave of the known signal.

Figure 12:
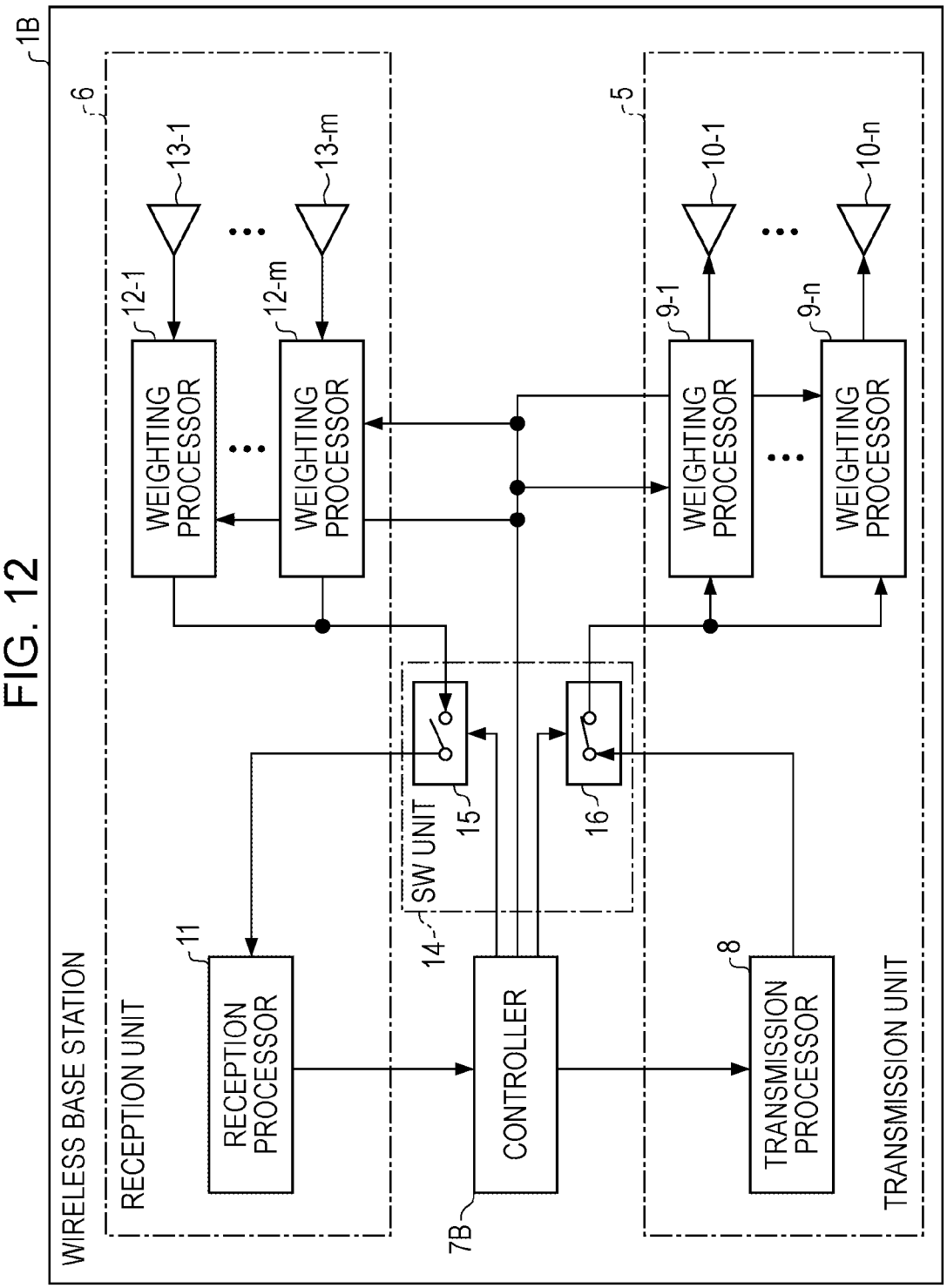
FIG. 12 is a diagram illustrating an example of a configuration of a wireless base station according to an example of a fifth modification.

FIG. 12 illustrates an example of the configuration of a wireless base station 1B of the present example. As illustrated in FIG. 12, in addition to the configuration of the wireless base station 1 exemplified in FIG. 2, the wireless base station 1B of the present example includes a switch (SW) unit 14 switching between the operations of a transmission unit 5 and a reception unit 6 in a time division manner. The SW unit 14 includes a switch 15 subjecting the reception operation of the reception unit 6 to on-off switching and a switch 16 subjecting the transmission operation of the transmission unit 5 to on-off switching.

The switches 15 and 16 are controlled by a controller 7B. For example, during the transmission of the known signal, the switches 15 and 16 are controlled so that the switch 15 turns off the reception operation of the reception unit 6 and the switch 16 turns on the transmission operation of the transmission unit 5. In addition, after the transmission of the known signal has been completed, the switch 15 turns on the reception operation of the reception unit 6 and the switch 16 turns off the transmission operation of the transmission unit 5.

At this time, by providing some margin of time in a time taken for switching from the transmission operation to the reception operation, it may be possible to avoid erroneous detection due to reflection from the wall 3-3 closest to the installation location of the wireless base station 1B, using the point that there is no input from the reception antenna 13 before switching. For example, when a time taken for switching is set to about 3 ns, it may be possible to ignore a reflected wave from a wall or the like located within a round trip distance less than or equal to about 1 m.

Figure 13:
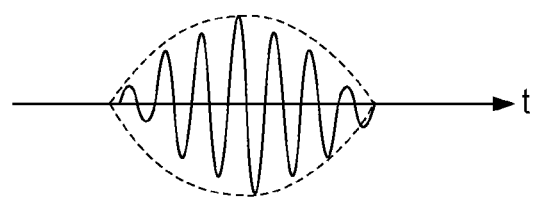
FIG. 13 is a diagram illustrating an example of a waveform of the known signal.

In addition, for example, it is desirable that, as illustrated in FIG. 13, as the known signal used in the present example, a signal such as a short pulse signal or the like is used whose period is shorter than a time from when the transmission unit 5 starts the transmission of the known signal until when the SW unit 14 turns on the reception operation in the reception unit 6. Accordingly, before the SW unit 14 performs the switching of the transmission and reception operation, it may be possible to desirably complete the transmission of the known signal, and it may be possible to avoid the erroneous detection of the interference direction.

[7] Example of Sixth Modification

It may be considered that the interference direction detected in each of the above-mentioned examples does not change, as long as a radio wave propagation environment such as the location of the wireless base station 1, a positional relationship between surrounding reflection objects, or the like does not largely change. However, even if a direction may interfere with another communication device in a state in which the window 4 is open, the direction may not interfere with the other communication device in a state in which the window 4 is closed using a shutter or the like, in some cases.

Figure 14:
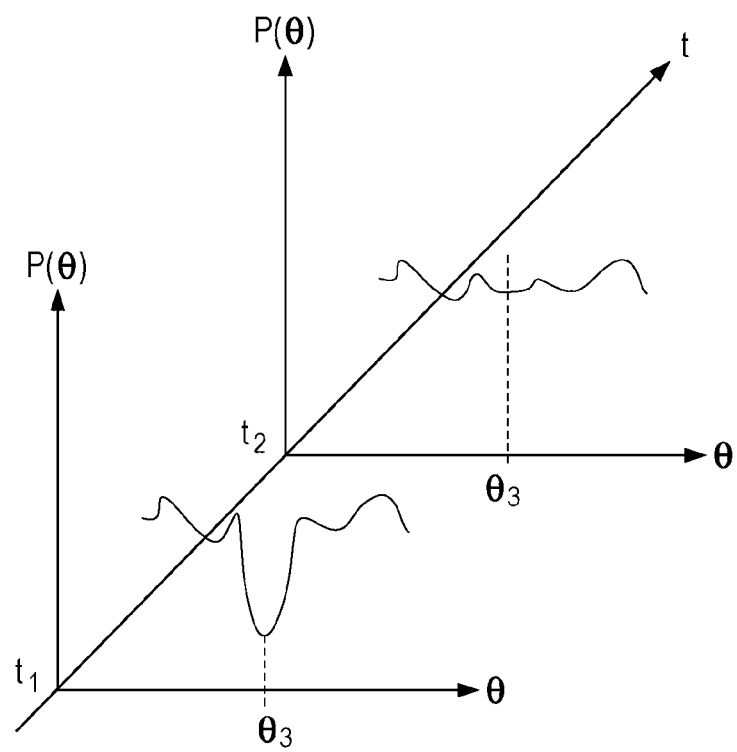
FIG. 14 is a diagram for explaining an operation of a wireless base station according to an example of a sixth modification.

Namely, as exemplified in FIG. 14, even if, at a time $t_1$, the reception intensity P($\theta_3$) of the reflected wave of the known signal transmitted in a $\theta_3$ direction is largely reduced, and the $\theta_3$ direction is detected as the interference direction in some cases, the reception intensity P($\theta_3$) of the reflected wave of the known signal transmitted in the $\theta_3$ direction does not drop at a time $t_2$ ($\neq t_1$), and the $\theta_3$ direction is not detected as the interference direction, in some cases.

Therefore, in the present example, the detection processing for the interference direction is regularly or irregularly performed more than once. The transmission direction of the wireless signal addressed to the wireless terminal 2 is determined on the basis of a correspondence relationship between the transmission direction $\theta$ of the known signal and the reception intensity $P(\theta)$ of the reflected wave, acquired at each time.

Figure 15:
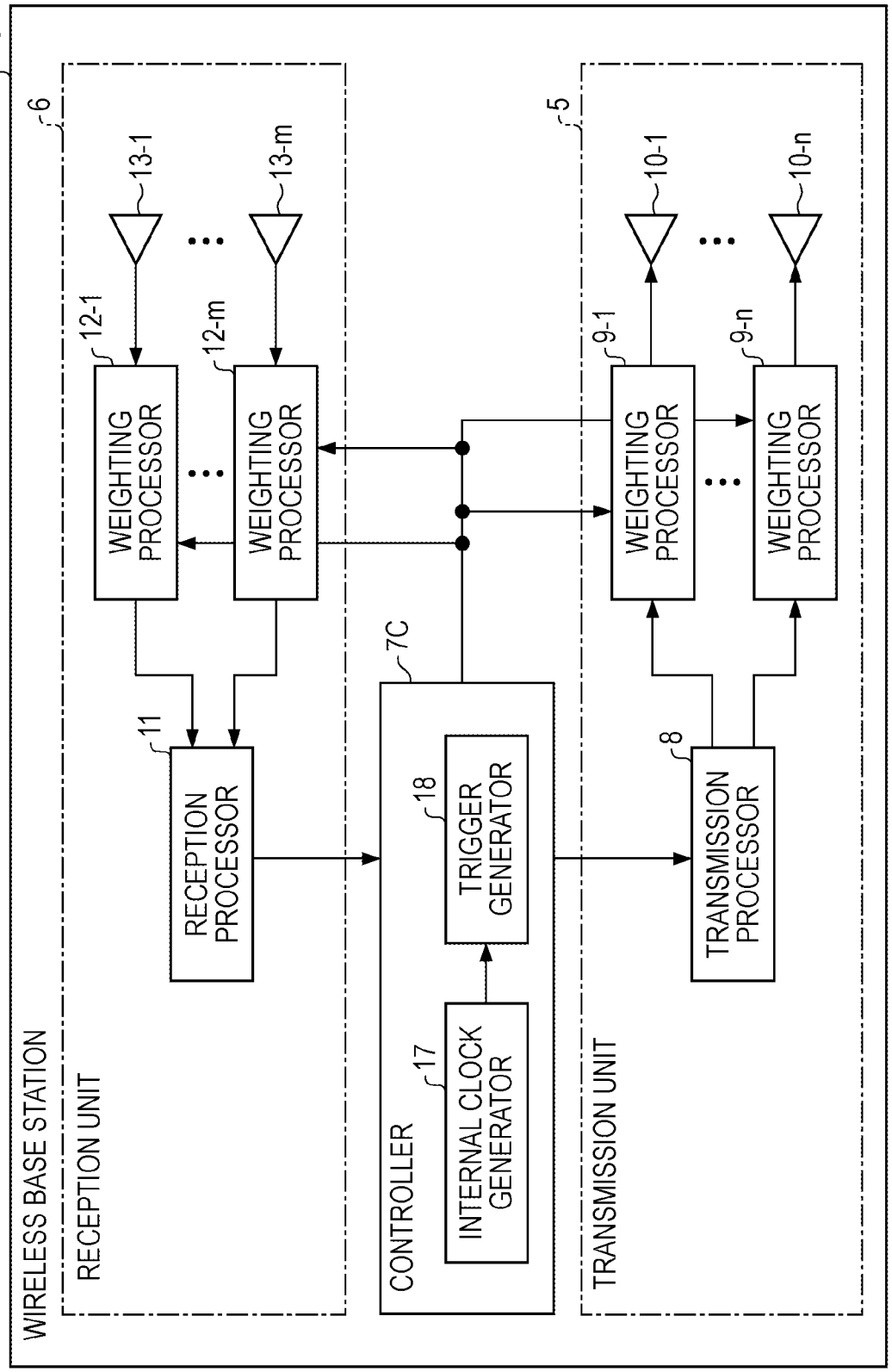
FIG. 15 is a diagram illustrating an example of a configuration of the wireless base station according to an example of the sixth modification.

FIG. 15 illustrates an example of the configuration of a wireless base station 1C according to the present example. As illustrated in FIG. 15, in the configuration of the wireless base station 1 exemplified in FIG. 2, the wireless base station 1C of the present example includes a controller 7C in place of the controller 7.

The controller 7C regularly or irregularly performs the detection processing for the interference direction more than once. Therefore, for example, the controller 7C includes an internal clock generator 17 and a trigger generator 18. For example, the internal clock generator 17 starts counting with the internal timer after the power activation of the wireless base station 1C, and outputs a count result to the trigger generator 18. When a result, obtained by subjecting the count result in the internal clock generator 17 to a remainder operation using a desirable number N (N>0), becomes 0, the trigger generator 18 generates a trigger signal instructing the transmission processor 8 to generate the known signal. For example, when the N is set to 1800 seconds (=30 minutes), the wireless base station 1C performs the detection processing for the interference direction every 30 minutes after the power activation of the wireless base station 1C, and determines the transmission direction of the wireless signal addressed to the wireless terminal 2 on the basis of the detected interference direction.

As described above, according to the present example, even if a radio wave propagation environment changes at each time, it may be possible to desirably detect the interference direction.

[8] Example of Seventh Modification

When the first threshold value $P_{th}$ set in the above-mentioned one embodiment is not adequate, the wireless signal addressed to the wireless terminal 2 is transmitted in a direction that may interfere with another communication device, in some cases.

Figure 16:
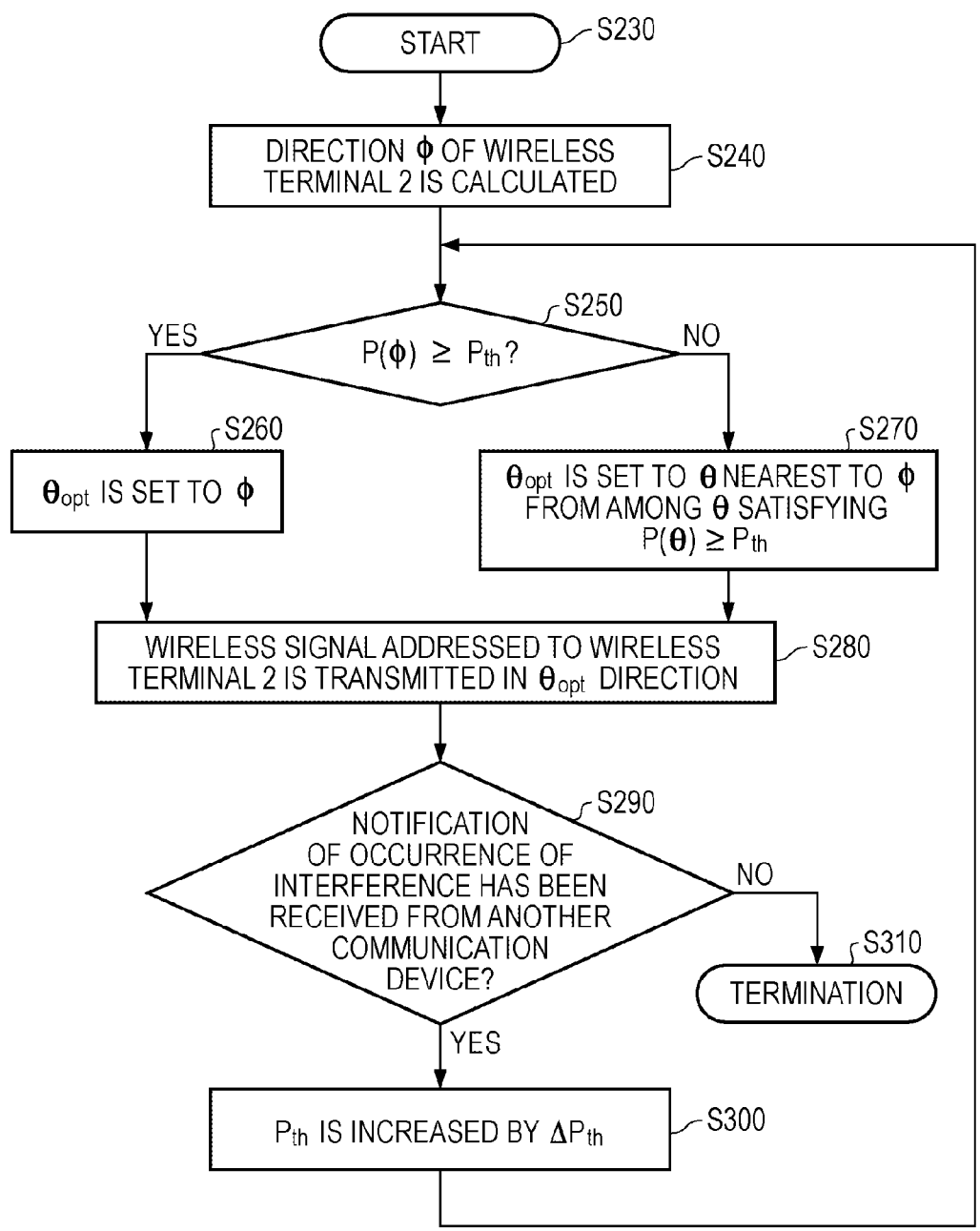
FIG. 16 is a flowchart illustrating an example of an operation of a wireless base station according to an example of a seventh modification.

In such a case, it is desirable to adjust the first threshold value $P_{th}$ to an adequate value by being notified from another communication device or the like of the occurrence of interference. Therefore, in the present example, when being notified by another communication device or the like of the occurrence of interference, the first threshold value $P_{th}$ is gradually increased until the notification disappears. FIG. 16 illustrates an example of processing according to the present example.

As illustrated in FIG. 16, when the transmission processing for the wireless signal has been started (Step S230), the controller 7 calculates the direction $\phi$ ($\phi \geq 0$ degrees) in which the wireless terminal 2 is located (Step S240). Next, the controller 7 determines whether the reception intensity $P(\phi)$ of the reflected wave with respect to the direction $\phi$ in which the wireless terminal 2 is located is greater than or equal to the first threshold value $P_{th}$ initially set on the basis of the average value of the reception intensities of the individual reflected waves, for example (Step S250).

Here, when it is determined that the $P(\phi)$ is greater than or equal to the first threshold value $P_{th}$ (Step S250: "YES" route), the controller 7 sets, to $\phi$, the transmission direction $\theta_{opt}$ of the wireless signal addressed to the wireless terminal 2 (Step S260). In addition to this, the controller 7 controls the transmission unit 5 so that the wireless signal is transmitted in the $\theta_{opt}$ (=$\phi$) direction, and transmits the wireless signal to the wireless terminal 2 (Step S280).

On the other hand, when it is determined that the $P(\phi)$ is less than the initial first threshold value $P_{th}$ (Step S250: No route), the controller 7 sets the transmission direction $\theta_{opt}$ of the wireless signal addressed to the wireless terminal 2 to a direction $\theta_A$ nearest to the $\phi$ direction, from among $\theta$ satisfying $P(\theta) \geq P_{th}$, as exemplified in FIG. 7 (Step S270).

In addition, the controller 7 controls the transmission unit 5 so that the wireless signal is transmitted in the $\theta_{opt}$ (=$\theta_A$) direction that satisfies $P(\theta) \geq P_{th}$ and is nearest to the $\phi$ direction, and transmits the wireless signal to the wireless terminal 2 (Step S280). Next, the controller 7 determines whether the reception unit 6 has received, from another communication device, a notification indicating that the wireless signal transmitted in Step S280 has interfered with the other communication device (Step S290).

Here, when it is determined that the above-mentioned notification has been received from the other communication device (Step S290: "YES" route), the wireless base station 1 determines that the value of the above-mentioned set first threshold value $P_{th}$ is not adequate and the interference direction is erroneously detected. Then the wireless base station increases the first threshold value $P_{th}$ by a predetermined control width $\Delta P_{th}$ (>0) (Step S300). The setting value of the control width $\Delta P_{th}$ may be set to about 1 dB, for example.

In addition, the wireless base station 1 repeatedly performs the processing operations in the above-mentioned Steps S250 to S290, using the threshold value ($P_{th}+\Delta P_{th}$) changed in Step S300, and when it is determined that the above-mentioned notification has not received from the other communication device (Step S290: "No" route), the wireless base station 1 terminates the corresponding processing.

As described above, according to the present example, it may be possible to adjust the transmission direction of the wireless signal addressed to the wireless terminal 2 to an adequate direction when the interference with the other communication device has occurred, it may be possible to more desirably reduce the interference.

In the above-mentioned example, an example has been described in which the first threshold value $P_{th}$ is changed so that the interference with the other communication device disappears. Similarly, the remaining threshold values $P_{Ith}$, $P_{th}$ ($t_{delay}$), and $P_{th}'$ may also be arbitrarily changed in the same way so that the interference with the other communication device disappears.

[9] Example of Eighth Modification

Figure 17:
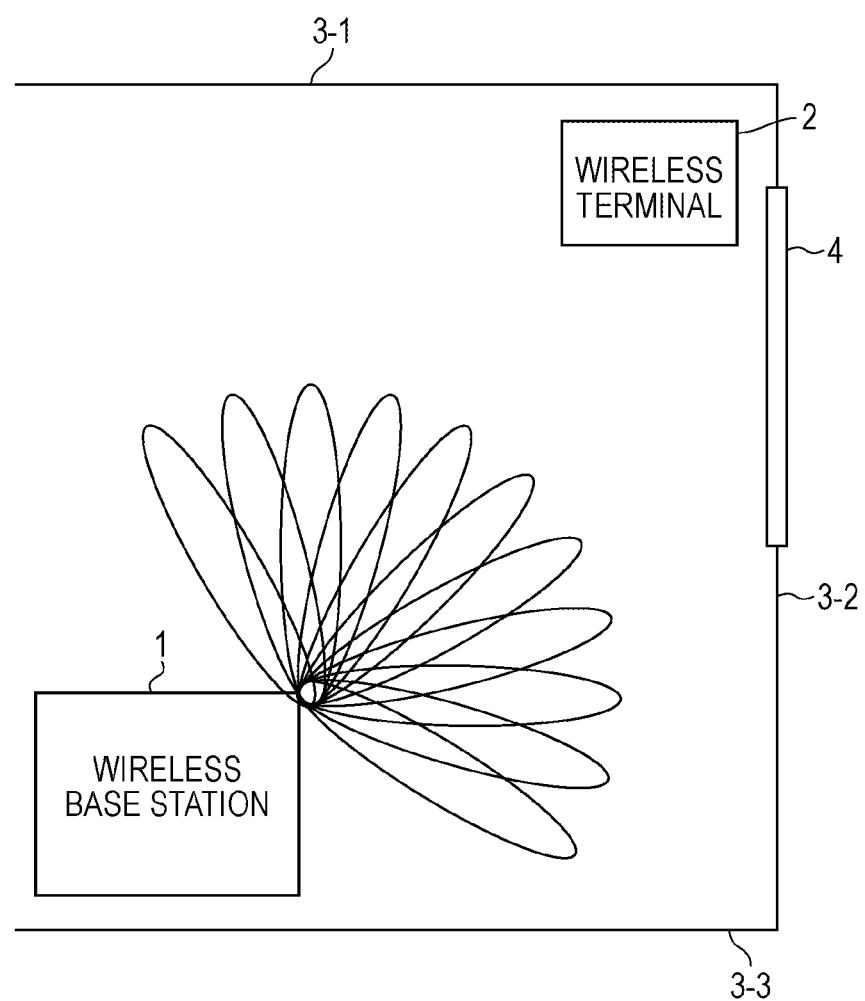
FIG. 17 is a diagram for explaining an operation of a wireless base station according to an example of an eighth modification.

When transmitting the known signal, the wireless base station 1 may not sequentially transmit the known signal in individual transmission directions but may simultaneously transmit the known signal in individual transmission directions, as exemplified in FIG. 17. In the present example, while an example will be described in which the known signal is simultaneously transmitted using a multibeam based on an orthogonal frequency division multiplexing (OFDM) method, a method for realizing the multibeam is not limited to this example. In the OFDM method, it may be possible to assign a phase to each subcarrier.

Figure 18:
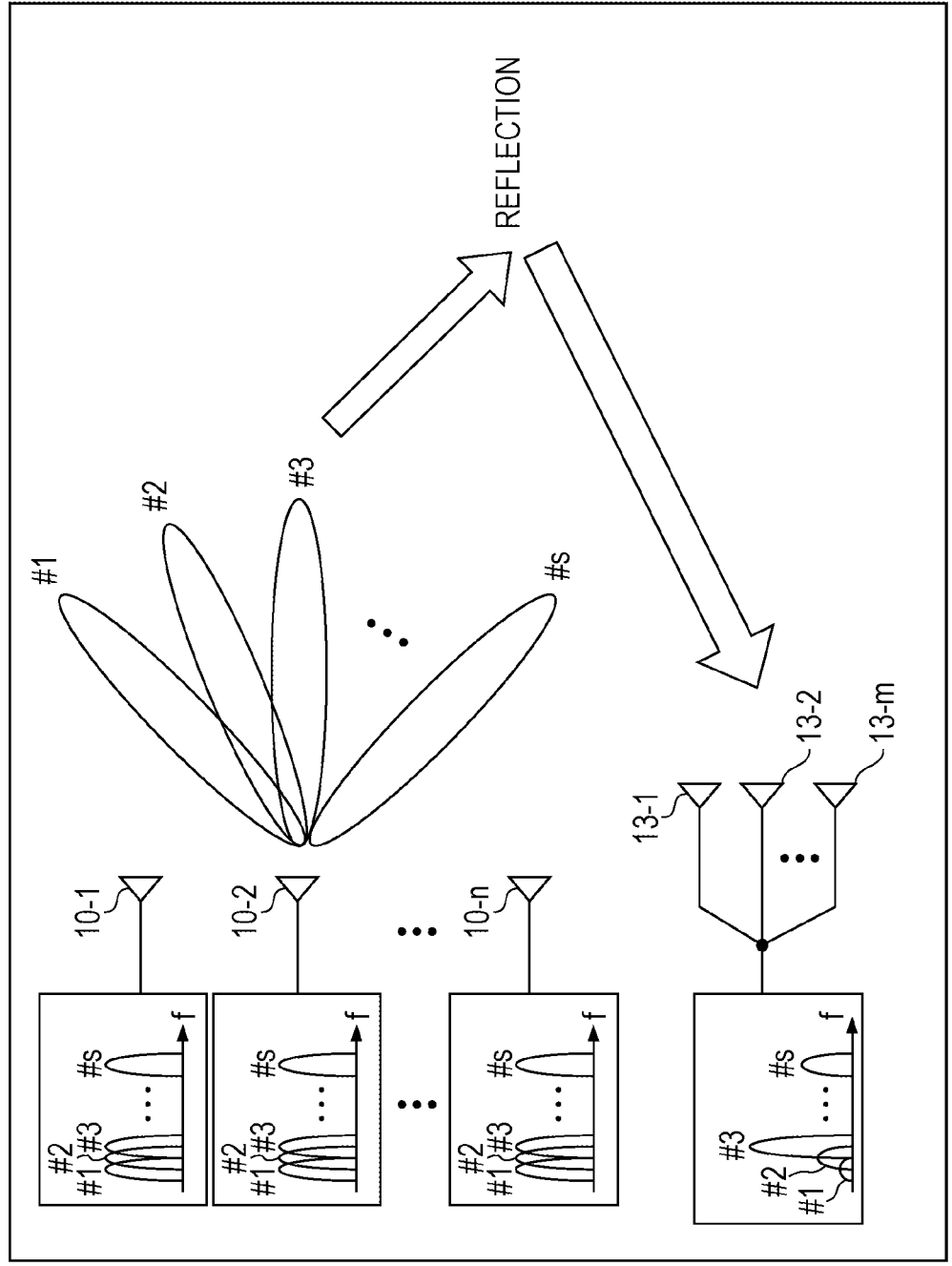
FIG. 18 is a diagram for explaining an operation of the wireless base station according to an example of the eighth modification.

FIG. 18 illustrates an example of the transmission/reception of the known signal, based on the multibeam. In FIG. 18, an OFDM signal is input to each transmission antenna 10, and phases different from one another are assigned to the individual subcarriers #1 to #s (s: an integer number greater than or equal to 2) of the OFDM signal input to each transmission antenna 10. Accordingly, the transmission beams #1 to #s configuring the multibeam are caused to correspond to the subcarriers #1 to #s, respectively.

In addition, in the reception antenna 13, by detecting the reception power of each subcarrier corresponding to each reflected wave of the known signal, it may be possible to detect the reception power of the reflected wave of each of the known signals simultaneously transmitted in the plural transmission beam directions. In the example illustrated in FIG. 18, when the reception power of the reflected wave of the subcarrier #3 is larger than the reception power of each of other reflected waves and greater than or equal to the first threshold value $P_{th}$, it may be determined that a direction in which the transmission beam #3 has been transmitted is not the interference direction.

Figure 19:
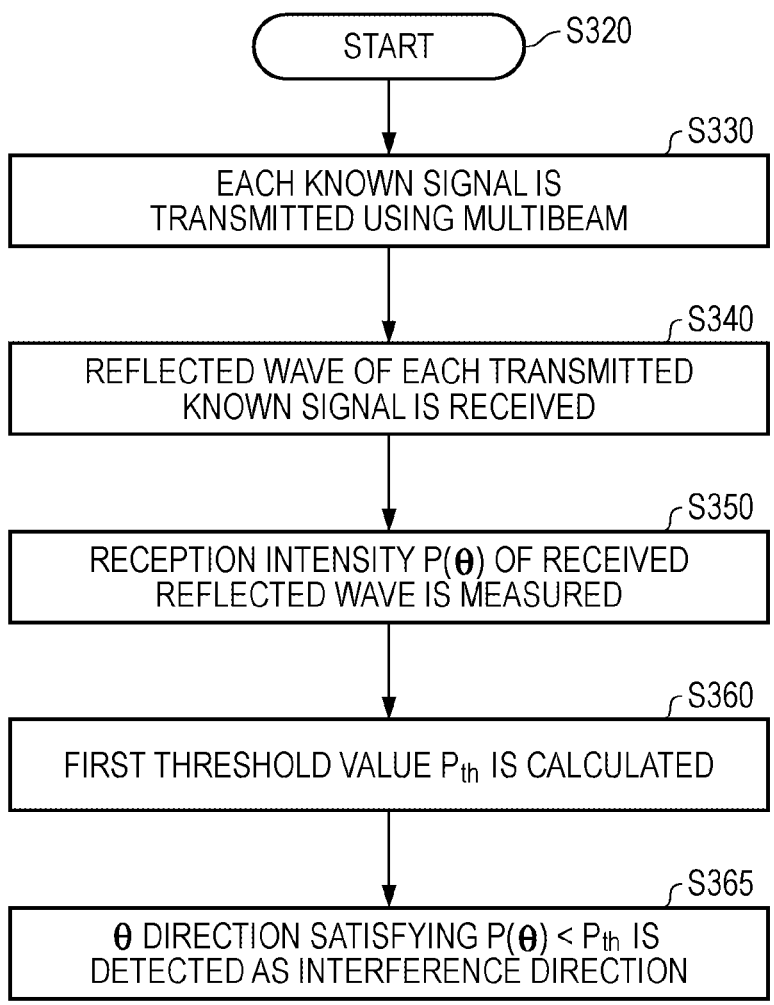
FIG. 19 is a flowchart illustrating an example of the operation of the wireless base station according to an example of the eighth modification.

FIG. 19 illustrates an example of processing according to the present example. As illustrated in FIG. 19, when the detection processing for the interference direction has been started (Step S320), the wireless base station 1 simultaneously transmits the individual known signals in the individual transmission beam directions using the multibeam including the transmission beams #1 to #s (Step S330). In addition, as described above, the timing at which the detection processing for the interference direction is started may be a regular or irregular timing based on an instruction from the controller 7 or a timing triggered by an event such as the timing of the power activation of the wireless base station 1 or the like. The detection processing for the interference direction may be started in a time period in which the wireless base station 1 and the wireless terminal 2 do not communicate with each other, or in a time period in which there is no access from the wireless terminal 2.

Each transmitted known signal is reflected from the surrounding walls 3-1 to 3-3, the window 4, or the like and received by the wireless base station 1 (Step S340). Next, the wireless base station 1 measures the reception intensity $P(\theta)$ of each received reflected wave (Step S350). Accordingly, it may be possible for the wireless base station 1 to recognize the degree of an intensity the reflected wave of the known signal transmitted in each transmission beam direction has when the reflected wave returns to the wireless base station 1.

Next, the wireless base station 1 calculates the first threshold value $P_{th}$ on the basis of the reception intensity $P(\theta)$ of each detected reflected wave (Step S360). Thereby, the wireless base station 1 detects, as the interference direction, a $\theta$ direction satisfying $P(\theta)<P_{th}$ (Step S365), and may perform such transmission processing for the wireless signal as described above.

As described above, according to the present example, since it may be possible to simultaneously transmit the known signals in the plural directions, it may be possible to further speed up the detection processing for the interference direction, performed in the wireless base station 1.

[10] Other

In addition, the configurations and the functions of the above-mentioned wireless base stations 1, 1A, 1B, and 1C, the above-mentioned wireless terminal 2, and the like may be sorted out if desired and may also be arbitrarily combined. Namely, the above-mentioned configurations and the above-mentioned functions may be sorted out or arbitrarily combined so that the above-mentioned function of the present technology may be fulfilled.

In addition, while, in each of the above-mentioned embodiment and the above-mentioned examples of the modifications, an example has been described in which one of the wireless base stations 1, 1A, 1B, and 1C, as an example of the wireless communication device, performs the detection processing for the interference direction and the transmission processing for the wireless signal, the wireless terminal 2 or the like having a relay function for the wireless signal may have the above-mentioned detection processing for the interference direction and the above-mentioned transmission processing for the wireless signal and perform the individual processing operations.

Furthermore, while, in each of the above-mentioned embodiment and the above-mentioned examples of the modifications, an example has been described in which the detection processing for the interference direction and the transmission processing for the wireless signal are performed with respect to the horizontal direction, the detection processing for the interference direction and the transmission processing for the wireless signal may also be performed with respect to the three-dimensional direction including the horizontal direction and the vertical direction.

Figure 20:
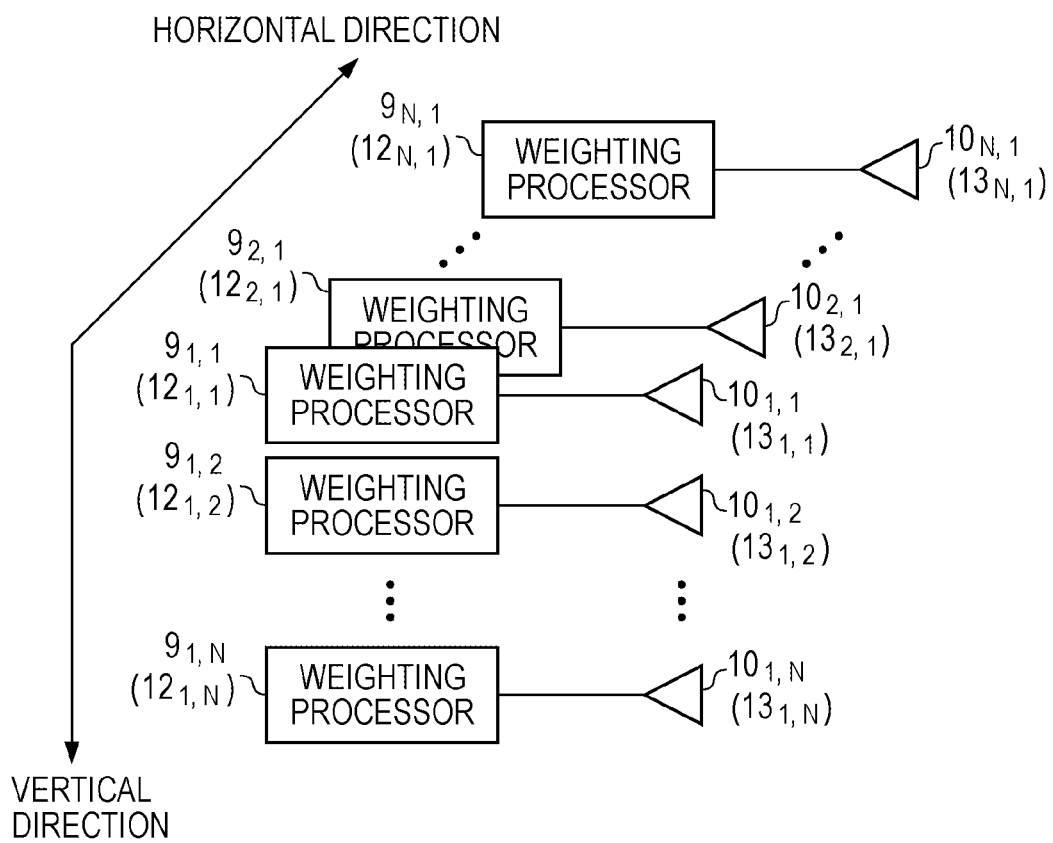
FIG. 20 is a diagram illustrating an example of a configuration of an antenna.

In this case, for example, as illustrated in FIG. 20, the wireless base station 1 includes weighting processors $9_{N,N}$ (N: an integer number greater than or equal to 2), and $12_{N,N}$, transmission antennas $10_{N,N}$, and reception antennas $13_{N,N}$, configured in a three-dimensional array shape. In addition, while, in FIG. 20, an example is illustrated in which the numbers of the weighting processors 9 and 12, the transmission antennas 10, and the reception antennas 13 installed in the horizontal direction and the numbers of the weighting processors 9 and 12, the transmission antennas 10, and the reception antennas 13 installed in the vertical direction are equal to each other, respectively, the numbers in each configuration is not limited to this example.

Figure 21:
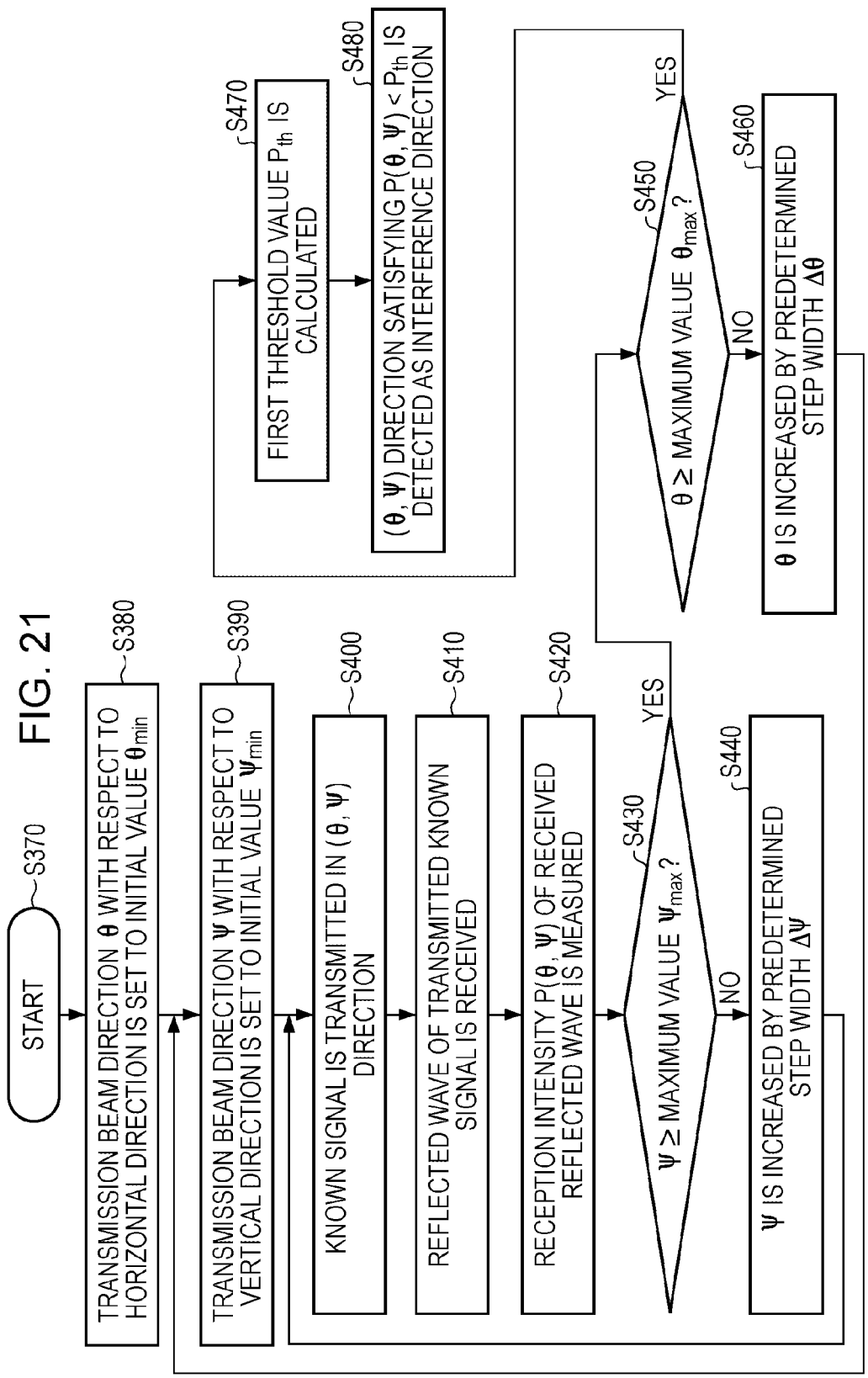
FIG. 21 is a flowchart illustrating an example of an operation of a wireless base station.

At this time, it may be possible for the wireless base station 1 to perform detection processing for the interference direction, exemplified in FIG. 21.

As illustrated in FIG. 21, first, when the detection processing for the interference direction has been started (Step S370), the controller 7 controls the transmission unit 5 so that a transmission beam direction $\theta$ with respect to the horizontal direction becomes the initial setting value $\theta_{min}$ of the beam scanning direction (Step S380).

Next, the controller 7 controls the transmission unit 5 so that a transmission beam direction $\psi$ with respect to the vertical direction becomes the initial setting value $\psi_{min}$ (0 degrees≤$\psi_{min}$<360 degrees) of the beam scanning direction (Step S390). Then, the transmission unit 5 transmits the known signal in the transmission beam direction ($\theta$, $\psi$) set in Steps S380 and S390 (Step S400).

The known signal transmitted from the transmission unit 5 is reflected from one of the walls 3-1 to 3-3, the window 4, or the like at least once, and received by the reception unit 6 (Step S410). The reception unit 6 measures a reception intensity $P(\theta, \psi)$ such as the reception power or the like of the received reflected wave (Step S420). Accordingly, it may be possible for the controller 7 to acquire the reception intensity $P(\theta_{min}, \psi_{min})$ of the reflected wave of the known signal transmitted in the ($\theta_{min}, \psi_{min}$) direction. Therefore, it may be possible for the wireless base station 1 to recognize the degree of an intensity the reflected wave of the known signal transmitted in the ($\theta_{min}, \psi_{min}$) direction when the reflected wave returns to the wireless base station 1.

When the measurement of the reception intensity $P(\theta_{min}, \psi_{min})$ with respect to the ($\theta_{min}, \psi_{min}$) direction has finished, the controller 7 determines whether the transmission beam direction ψ with respect to the current vertical direction is greater than or equal to the maximum setting value $\psi_{max}$ (0 degrees<$\psi_{max}$≤360 degrees) of the beam scanning direction (Step S430).

When it has been determined that the transmission beam direction ψ with respect to the current vertical direction is less than the maximum setting value $\psi_{max}$ of the beam scanning direction (Step S430: "NO" route), the controller 7 adds a predetermined step width Δψ (>0 degrees) to the transmission beam direction ψ (Step S440), and repeats processing operations in the above-mentioned Steps S400 to S430.

On the other hand, when it has been determined that the transmission beam direction ψ with respect to the current vertical direction is greater than or equal to the $\psi_{max}$ (Step S430: "YES" route), the controller 7 determines whether the transmission beam direction θ with respect to the current horizontal direction is greater than or equal to the maximum setting value $\theta_{max}$ of the beam scanning direction (Step S450).

When it has been determined that the transmission beam direction θ with respect to the current horizontal direction is less than the maximum setting value $\theta_{max}$ of the beam scanning direction (Step S450: "NO" route), the controller 7 adds a predetermined step width Δθ to the transmission beam direction θ (Step S460), and repeats processing operations in the above-mentioned Steps S390 to S450.

On the other hand, when it has been determined that the transmission beam direction θ with respect to the current horizontal direction is greater than or equal to the maximum setting value $\theta_{max}$ (Step S450: "YES" route), the controller 7 calculates the first threshold value $P_{th}$ on the basis of individual reception intensities P ($\theta_{min}$, $\psi_{min}$) to P ($\theta_{max}$, $\psi_{max}$) detected in the reception unit 6 (Step S470). Then, the wireless base station 1 detects the (θ, ψ) direction satisfying P(θ, ψ)<$P_{th}$ as the interference direction (Step S480).

Figure 6:
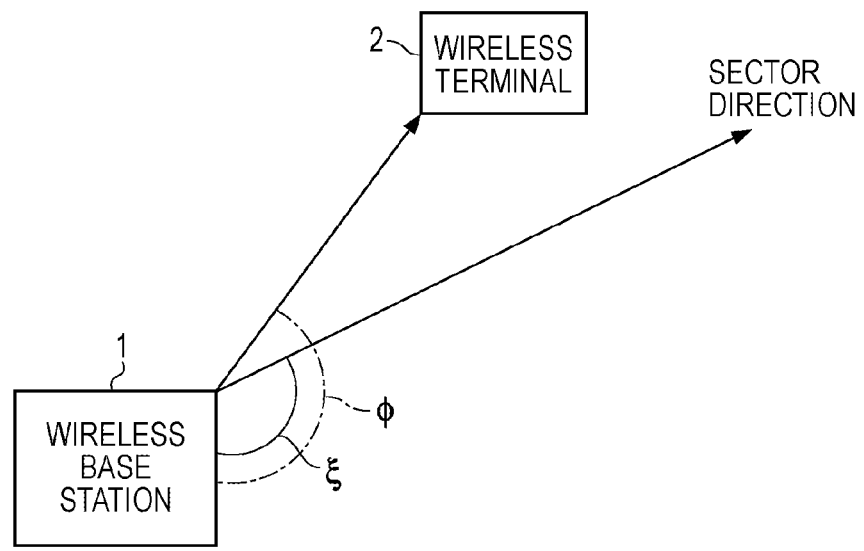
FIG. 6 is a diagram explaining an example of calculation of a communication partner direction.
Figure 22:
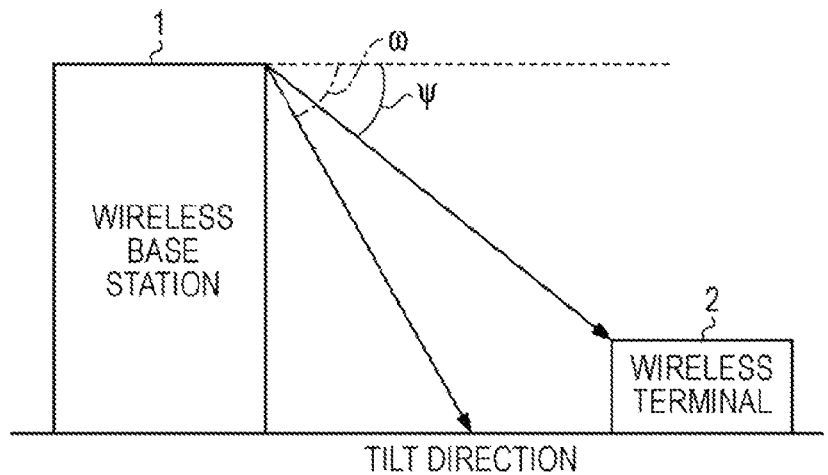
FIG. 22 is a diagram explaining an example of calculation of a communication partner direction.

When the direction of the wireless terminal 2 is detected on the basis of the uplink signal, the controller 7 performs beam scanning with respect to a reception beam direction (sector direction) ξ in the horizontal direction and a reception beam direction (tilt direction) ψ in the vertical direction by controlling the reception antenna weight, as exemplified in FIG. 6 and FIG. 22. In addition, the controller 7 detects the reception beam direction (ξ, ψ){=(φ, ω)} where the reception antenna gain of the uplink signal is maximized, and detects the corresponding direction as the direction of the wireless terminal 2.

At this time, it is assumed that the arrival direction in a horizontal plane of the uplink signal from the wireless terminal 2 is φ, the horizontal directivity direction of the antenna is ξ, the vertical plane arrival direction of a terminal signal is ψ, the vertical directivity direction of the antenna is ω, a reception antenna gain is G(φ, ξ, ψ, ω). A reception antenna weight $w_{x,y}$ (x=1 to N, and y=1 to N) assigned to the reception antenna 13 by the weighting processor 12 illustrated in FIG. 20 is defined in accordance with Expression 4.

[Expression 4]

$$\exp\left(jx\frac{d}{\lambda}\psi + jy\frac{d}{\lambda}\phi\right)$$

(j: imaginary unit)

Accordingly, the reception antenna gain G(φ, ξ, ψ, ψ) may be expressed as follows.

[Expression 5]

$$G(\phi, \xi, \psi, \omega) = \frac{\sin Nd(\xi - \phi)/\lambda}{\sin d(\xi - \phi)/\lambda} \times \frac{\sin Nd(\omega - \psi)/\lambda}{\sin d(\omega - \psi)/\lambda}$$

Here, the G(φ, ξ, ψ, ω) is a function to be maximized when φ=ξ and ψ=ω, namely, the directivity direction of the reception antenna and the direction of the wireless terminal 2 coincide with each other. This indicates that, by detecting the reception antenna weight where the corresponding function indicates a maximum value, it may be possible to detect the direction of the wireless terminal 2.

[11] Example of Hardware Configuration

Figure 23:
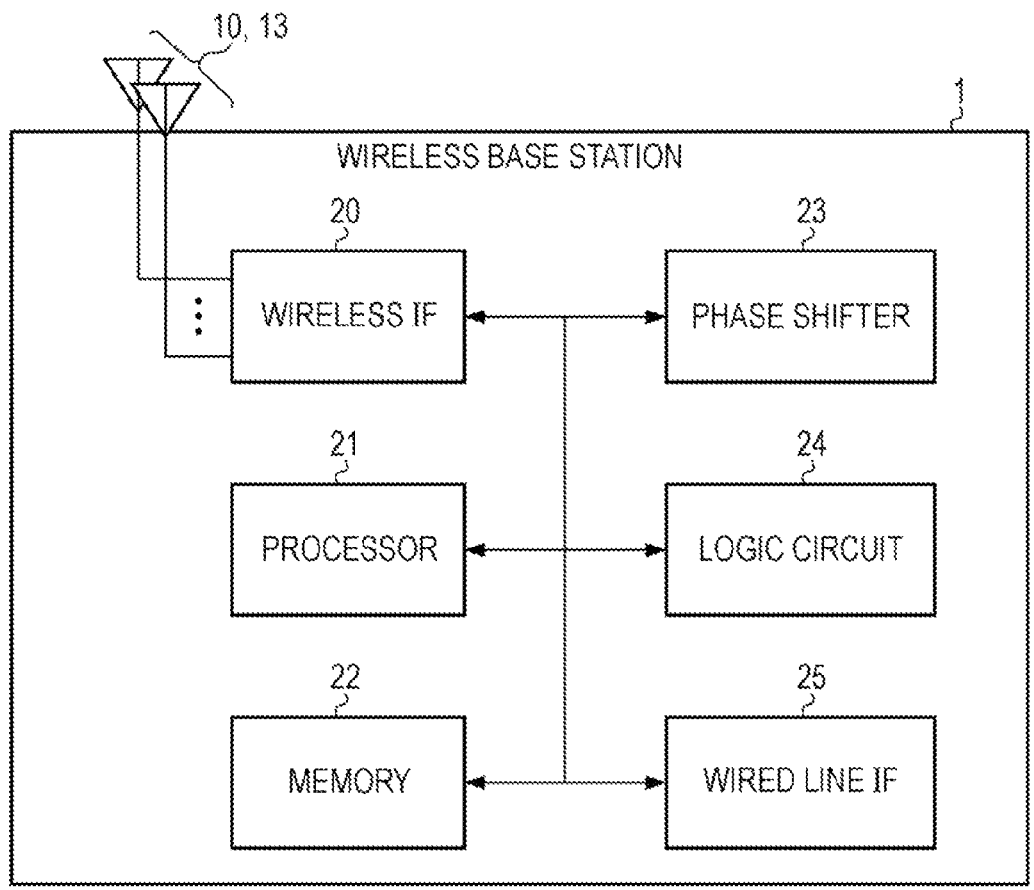
FIG. 23 is a diagram illustrating an example of a hardware configuration of a wireless base station.

Here, FIG. 23 illustrates an example of the hardware configuration of each of the wireless base stations 1, 1A, 1B, and 1C.

The antennas 10 and 13 are devices for transmitting or receiving a wireless signal. A wireless IF 20 is an interface device for performing wireless communication with the wireless terminal 2. A processor 21 is a device for processing data, and includes a central processing unit (CPU), a digital signal processor (DSP), or the like, for example. A memory 22 is a device for storing therein data, and includes a read only memory (ROM), a random access memory (RAM), or the like, for example. A phase shifter 23 is a device for assigning antenna weights to the antennas 10 and 13. A logic circuit 24 is an electronic circuit performing a logic operation, and includes a large scale integration (LSI), a field-programmable gate array (FPGA), or the like, for example. A wired line IF 25 is an interface device for performing wire communication with a wireless base station or the like, connected to a network on the network side of a mobile phone system (so-called backhaul network), an external system, or the like.

In addition, as an example, a correspondence relationship between each configuration in the wireless base station 1 exemplified in FIG. 2 and each configuration in the wireless base station 1 exemplified in FIG. 23 is as follows, for example. The wireless IF 20 and the phase shifter 23 correspond to the weighting processors 9 and 12, for example. The processor 21, the memory 22, and the logic circuit 24 correspond to the controller 7, the transmission processor 8, and the reception processor 11, for example. The illustration of the wired line IF 25 is omitted in FIG. 2.

In addition, FIG. 24 illustrates an example of the hardware configuration of the wireless terminal 2. An antenna 30 is a device for transmitting or receiving a wireless signal. A wireless IF 31 is an interface device for performing wireless communication with the wireless base station 1. A processor 32 is a device for processing data, and includes a CPU, a DSP, or the like, for example. A memory 33 is a device for storing therein data, and includes a ROM, a RAM, or the like, for example. A logic circuit 34 is an electronic circuit performing a logic operation, and includes an LSI, an FPGA, or the like, for example. An input IF 35 is a device for inputting, and includes an operation button, a microphone, or the like, for example. An output IF 36 is a device for outputting, and includes a display, a speaker, or the like, for example.

The antenna 30 functions as an example of the reception unit receiving the wireless signal transmitted by the wireless base station 1 in the transmission direction determined as described above. The wireless IF 31, the processor 32, and the logic circuit 34 function as an example of the processor performing the predetermined reception processing on the wireless signal received by the antenna 30.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:
   a transmitter configured to transmit a known signal in each of a plurality of first directions different from each other;
   a receiver configured to receive a plurality of first reflected waves, each of the plurality of first reflected waves being generated by the known signal transmitted in each of the plurality of first directions and to detect each of a plurality of first reception intensities, each of the plurality of first reception intensities being associated with each of the plurality of first reflected waves; and
   a controller configured to determine a transmission direction of a radio signal addressed to a first wireless terminal, based on the plurality of first reception intensities and to control the transmitter to transmit the radio signal in the transmission direction, wherein
   the controller controls the transmitter to transmit the radio signal in a second direction toward the first wireless terminal when a second reception intensity of a second reflected wave generated by the known signal transmitted toward the first wireless terminal is larger than or equal to a first threshold level, and
   the controller controls the transmitter to transmit the radio signal in a third direction nearest to the second direction among a plurality of fourth directions in the plurality of first directions, each of a plurality of third reception intensities associated with each of a plurality of third reflected waves transmitted each of the plurality of fourth directions being larger than or equal to the first threshold level, when the second reception intensity is smaller than the first threshold level.

2. The wireless communication device according to claim 1, wherein
   the receiver detects a fourth reception intensity of an interference signal transmitted from a fifth direction opposite to the second direction, and
   the controller controls the transmitter to transmit the radio wave in the fifth direction when the second reception intensity is smaller than the first threshold level and the fourth reception intensity is smaller than a second threshold level.

3. The wireless communication device according to claim 1, wherein the first threshold level is a first value determined based on an average value of the plurality of first reception intensities.

4. The wireless communication device according to claim 1, wherein the first threshold level is a second value, based on a duration time between a transmission of one of the plurality of first radio signals from the transmitter and a reception of a corresponding one the plurality of reflected waves received by the receiver.

5. The wireless communication device according to claim 1, wherein
   the controller controls the transmitter to transmit the radio signal in a second direction toward the first wireless terminal regardless of a second reception intensity of a second reflected wave generated by the known signal transmitted toward the first wireless terminal, when an average value of the plurality of first reception intensities is smaller than a third threshold level.

6. The wireless communication device according to claim 1, further comprising a switch configured to stop an reception operation of the receiver while the transmitter transmits the known signal and to proceed with the reception operation after completion of transmission of the known signal.

7. The wireless communication device according to claim 6, wherein
   a time duration of the known signal is shorter than a time interval between staring a transmission of the known signal by the transmitter and proceeding with the reception operation in the receiver.

8. The wireless communication device according to claim 1, wherein
   the receiver receives, from a second wireless terminal other than the first wireless terminal, information notifying that the radio signal gives interference to the second wireless terminal, and
   the controller increases a value of the first threshold level based on the notified information.

9. The wireless communication device according to claim 1, wherein the transmitter transmit sequentially the known signal in a respectively different direction among in the plurality of first directions after receiving one of the plurality of first reflected waves, one of the plurality of first reflected waves being generated by the known signal transmitted in a direction other than the respectively different direction.

10. The wireless communication device according to claim 1, wherein
    the transmitter is controlled to form each of a plurality of transmission beams to be transmitted in each of the plurality of first directions and to transmit the known signal in each of the plurality of first directions at a time.

11. A wireless communication device that controls a direction of a transmission beam, the wireless transmission device comprising:
    an adaptive array antenna; and
    a controller configured to control a direction in which the transmission beam to be transmitted from the adaptive array antenna is formed, wherein the controller performs a control by which the transmission beam is directed to a plurality of first directions that are different from each other in which a known signal is transmitted, and the controller controls a radio signal addressed to a wireless terminal so as to be transmitted in a transmission direction of the plurality of first directions, the direction being obtained based on a reception intensity of a reflected wave generated by reflection of the known signal, wherein
    the controller controls the adaptive array antenna to transmit the radio signal in a second direction toward the wireless terminal when a second reception intensity of a second reflected wave generated by the known signal transmitted toward the wireless terminal is larger than or equal to a first threshold level, and
    the controller controls the adaptive array antenna to transmit the radio signal in a third direction nearest to the second direction among a plurality of fourth directions in the plurality of first directions, each of a plurality of third reception intensities associated with each of a plurality of third reflected waves transmitted in each of the plurality of fourth directions being larger than or equal to the first threshold level, when the second reception intensity is smaller than the first threshold level.

12. A wireless terminal comprising:
a receiver configured to receive a radio signal transmitted in a transmission direction from a wireless communication device, the transmission direction being determined based on a plurality of reception intensities, each of the plurality of reception intensities associated with each of a plurality of reflected waves, each of the plurality of reflected waves being generated by a known signal transmitted in each of a plurality of first directions different from each other; and
a processor configured to process the received radio signal, wherein
the wireless communication device:
  transmits the radio signal in a second direction toward the wireless terminal when a second reception intensity of a second reflected wave generated by the known signal transmitted toward the wireless terminal is larger than or equal to a first threshold level, and
  transmits the radio signal in a third direction nearest to the second direction among a plurality of fourth directions in the plurality of first directions, each of a plurality of third reception intensities associated with each of a plurality of third reflected waves transmitted in each of the plurality of fourth directions being larger than or equal to the first threshold level, when the second reception intensity is smaller than the first threshold level.

13. A wireless transmission system comprising:
a wireless transmission device including:
  a transmitter configured to transmit a known signal in each of a plurality of first directions different from each other;
  a receiver configured to receive a plurality of first reflected waves, each of the plurality of first reflected waves being generated by the known signal transmitted in each of the plurality of first directions and to detect each of a plurality of first reception intensities, each of the plurality of first reception intensities being associated with each of the plurality of first reflected waves, and
  a controller configured to determine a transmission direction of a radio signal addressed to a first wireless terminal, based on the plurality of first reception intensities and to control the transmitter to transmit the radio signal in the transmission direction, wherein
  the controller controls the transmitter to transmit the radio signal in a second direction toward the first wireless terminal when a second reception intensity of a second reflected wave generated by the known signal transmitted toward the first wireless terminal is larger than or equal to a first threshold level, and
  the controller controls the transmitter to transmit the radio signal in a third direction nearest to the second direction among a plurality of fourth directions in the plurality of first directions, each of a plurality of third reception intensities associated with each of a plurality of third reflected waves transmitted in each of the plurality of fourth directions being larger than or equal to the first threshold level, when the second reception intensity is smaller than the first threshold level; and
a wireless terminal including:
  a receiver configured to receive the radio signal transmitted from the wireless communication device, and
  a processor configured to process the received radio signal.

14. A method for detecting an interference direction and transmitting a radio signal based on the detected interference direction, the method comprising:
  transmitting a known signal in each of a plurality of first directions different from each other;
  receiving each of a plurality of first reflected waves, each of the plurality of first reflected waves being associated with the known signal transmitted in one of the plurality of first directions;
  detecting an interference direction based on a plurality of first reception intensities, each of the plurality of first reception intensities being each of the plurality of first reflected waves;
  transmitting a radio signal in a transmission direction based on the plurality of first reception intensities;
  transmitting the radio signal in a second direction when a second reception intensity of a second reflected wave generated by the known signal is larger than or equal to a first threshold level, and
  transmitting the radio signal in a third direction nearest to the second direction among a plurality of fourth directions in the plurality of first directions, each of a plurality of third reception intensities associated with each of a plurality of third reflected waves transmitted in each of the plurality of fourth directions being larger than or equal to the first threshold, when the second reception intensity is smaller than the first threshold level.

* * * * *